(12) United States Patent
Nagata et al.

(10) Patent No.: US 7,199,951 B2
(45) Date of Patent: Apr. 3, 2007

(54) DECENTERING OPTICAL SYSTEM, HOLDING STRUCTURE OF DECENTERING OPTICAL SYSTEM, AND OPTICAL APPARATUS USING THE SAME

(75) Inventors: Tetsuo Nagata, Hachioji (JP); Tomoko Sato, Hachioji (JP); Akihiro Sakurai, Hino (JP); Tetsuya Ishii, Hachioji (JP); Takeshi Takahashi, Hachioji (JP); Kazuhiro Matsumoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 21 days.

(21) Appl. No.: 10/901,369

(22) Filed: Jul. 29, 2004

(65) Prior Publication Data
US 2005/0063075 A1    Mar. 24, 2005

(30) Foreign Application Priority Data
Aug. 6, 2003 (JP) .............................. 2003-288008

(51) Int. Cl.
G02B 7/18 (2006.01)
G02B 5/04 (2006.01)

(52) U.S. Cl. ..................................... 359/831
(58) Field of Classification Search ................ 359/831, 359/834; 348/340
See application file for complete search history.

(56) References Cited
U.S. PATENT DOCUMENTS
6,034,821 A * 3/2000 Schenfeld et al. .......... 359/618

| | | | |
|---|---|---|---|
| 6,327,094 B1 * | 12/2001 | Aoki ........................... | 359/637 |
| 6,650,483 B2 | 11/2003 | Uehara et al. .............. | 359/631 |
| 6,704,052 B1 * | 3/2004 | Togino et al. .............. | 348/340 |
| 6,704,145 B1 * | 3/2004 | Benneyworth et al. ..... | 359/640 |
| 7,095,573 B2 * | 8/2006 | Nagata et al. .............. | 359/811 |
| 2003/0048550 A1* | 3/2003 | Atsumi et al. .............. | 359/819 |
| 2005/0134977 A1* | 6/2005 | Fukuda et al. .............. | 359/835 |

FOREIGN PATENT DOCUMENTS

| | | |
|---|---|---|
| JP | 11-326766 | 11/1999 |
| JP | 2001-27704 | 1/2001 |
| JP | 2005-274612 | * 10/2005 |

* cited by examiner

Primary Examiner—Mark A. Robinson
Assistant Examiner—Scott Stephens
(74) Attorney, Agent, or Firm—Kenyon & Kenyon LLP

(57) ABSTRACT

The decentering optical system comprises a decentering prism and a holding component. The decentering prism has two or more positioning portions at positions which sandwich an effective diameter of an optically functional surface held by the holding component. The holding component has a holding portion of positioning portions corresponding to the positioning portions of the decentering prism. Furthermore, on the optically functional surface of the decentering prism, two and more projected portions are arranged at a position which sandwich the effective diameter of the optically functional surface and is located at the outside of the positioning portion, and a projected portion is located inside of the positioning portion. The decentering prism is fixed for positioning at the holding component through the positioning portion, the holding portion of the positioning portion and the projected portions.

8 Claims, 26 Drawing Sheets

DECENTERING OPTICAL SYSTEM, HOLDING STRUCTURE OF DECENTERING OPTICAL SYSTEM, AND OPTICAL APPARATUS USING THE SAME

This application claims priority to Japanese Patent Application No. 2003-288008 filed 6 Aug. 2003, the content of which is incorporated herein by reference in its entirety.

BACKGROUND OF THE INVENTION

1. Field of the Invention

The present invention relates to an image forming optical system, particularly a decentering optical system having power at a reflecting surface for an optical apparatus, such as a video camera, a digital still camera, a film scanner, an endoscope, etc., in which a small imaging element is used, a holding structure of the decentering optical system and an optical apparatus using the same.

2. Description of the Related Art

Recently, in an image forming optical system for a video camera, a digital still camera, a film scanner, an endoscope, etc., achieving small sizing, weight lightening and low cost as for the optical system itself have been demanded with development of the miniaturization of the imaging element.

Conventionally, a prism optical systems using a free curved surface, etc. has been proposed for further thinning the optical system.

In an example, a state of positioning two prisms without having a rotationally asymmetric surface has been disclosed. Here, a depressed portion and a projected portion are formed as a position keeping means outside a light effective area on two faced surfaces of two prisms.

Furthermore, such composition has been disclosed that attaching of prisms is made while positioning of each prism is performed by fitting into the depressed portion and the projected portion.

In another example, a state of positioning of a prism having a rotationally asymmetric surface has been disclosed. Here, the depressed portion or the projected portion is formed in the prism.

With such disclosure, it has been also disclosed that a composition of positioning and fixing prisms on a holding component by forming a projected portion or a depressed portion which is fitted into the depressed portion or the projected portion of the prisms.

In other example, a state of positioning a prism having a rotationally asymmetric surface has been disclosed. Here, two projected portions are formed at a side surface of a prism, and a plane portion having two holes at a side surface of the other prism, each of which is fitted into the projected portion is formed. A composition for positioning and fixing two prisms by fitting these projected portions into the plane portion having holes has been disclosed. Furthermore, it has been also disclosed that a plane portion having holes formed at a side surface of the two prisms respectively, and a composition for positioning and fixing these prisms by using a screw from both sides of a rod-like component.

SUMMARY OF THE INVENTION

The decentering optical system according to the present invention comprises, at least one decentering prism, and a holding component for holding a decentering optical system, wherein the decentering prism has two or more positioning portions at positions which sandwich an effective diameter of an optically functional surface held by the holding component, and the holding component has a holding portion of positioning portions corresponding to the positioning portions of the decentering prism, and either the optically functional surface held by the holding component or the holding component has at least two projected portions at a position which is located at the outside of the positioning portion or the holding portion of the positioning portions, and sandwich the effective diameter of the optically functional surface, and the decentering prism is fixed for positioning at the holding component through the positioning portion, the positioning holding portion and the projected portions.

The decentering optical system according to the present invention comprises, a first decentering prism, a holding component having an aperture stop and a second decentering prism, wherein an exit surface of the first decentering prism and an incident surface of the second decentering prism have two or more positioning portions at positions which sandwich an effective diameter of an optically functional surface held by the holding component respectively, and the holding component has, at both surfaces respectively, a holding portion of positioning portion corresponding to the positioning portions of the first and the second decentering prisms, and, the first and the second decentering prisms are positioned and fixed from both sides of the positioning portions, the holding portion of positioning portion and the holding component.

The decentering optical system according to the present invention is composed such that either an optically functional surface which has a positioning portion of a first and a second decentering prism or the holding component has two or more projected portions at positions which sandwich an effective diameter of an optically functional surface and are located outside the positioning portions or holding portion of the positioning portions, and the holding portion of the positioning portion of the first decentering prism and the holding portion of the positioning portion of the second decentering prism in the holding component are located at different positions each other.

The optical apparatus according to the present invention is composed by using the decentering optical system having a holding structure according to the present invention mentioned above.

According to the present invention, a holding structure of decentering optical system which satisfies small sizing and a high performance, and enables to perform precise positioning, and a decentering optical system and an optical apparatus using the same can be provided.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
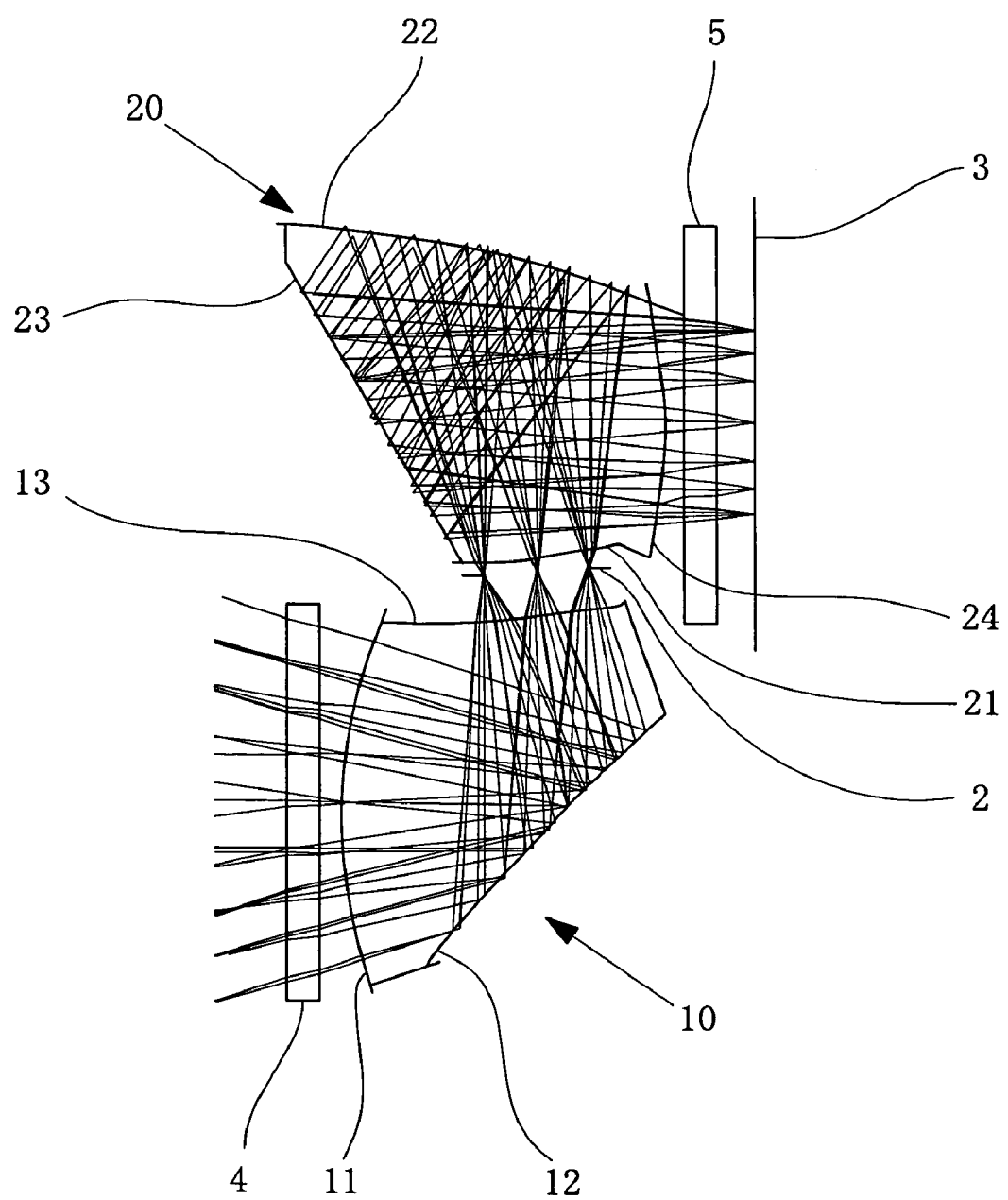
FIG. 1 is a sectional view developed along an optical axis showing an example of a decentering optical system to which each holding structure of the present invention is applied.

Prior to explaining embodiments, reasons why the constitution of the present invention has been made as well as function and advantages of the present invention will be explained.

It is required that in order to achieve thinning of shape a prism having a power is held for positioning with high precision. However, according to a decentering optical system and a holding structure of the decentering optical system of the present invention, by two positioning portions, a positioning of X and Y directions of a prism can be performed with sufficient accuracy, and at the same time an accuracy of inclination of the prism can be held with high precision by three projected portions.

Since the positioning portion is formed out of an effective diameter of an optically functional surface, the optically functional surface and the positioning portion can be simultaneously measured using a three dimensional measuring apparatus etc. On the other hand, if a holding portion is formed at the side of a prism, as a conventional way, a positional relationship between an optically functional surface and a holding portion cannot be simultaneously measured with sufficient accuracy.

According to the present invention, since two or more prisms are held by one holding component, the number of parts can be reduced.

According to the present invention, a positioning portion mainly determines a position (X, Y direction) of the prism, a projected portion determines an inclination of the prism. Therefore, in the way where each interval is taken long as much as possible, accuracy becomes better.

In the present invention, for example, a holding portion for positioning of a holding component is composed of a hole, and the positioning portion is formed as a cylindrical shape which is fitted into the hole, but the positioning portion cannot be long. It is because if it is made long, the holding component must be thickened and it becomes enlarged. When a position (a projected portion) holding the prism departs from the center of gravity position (a straight line passing through the center of gravity) of the prism, assembling with good accuracy cannot be made and stable holding cannot be performed. The straight line passing through the center of gravity means a straight line passing through the center of gravity position of a prism, and is a line perpendicular to a touching surface of a holding component and a prism.

There is a case that the center of gravity positions of two prisms may differ. In this case, it is desirable that a positioning portion of the prism is arranged near the center of gravity position of the prism in order to hold two prisms in stabilized state and with high accuracy. Furthermore, with respect to the holding component holding two prisms, it is desirable that the position of the holding portion for positioning is changed. In such way, it is desirable that the straight lines passing through the center of gravity of two prisms do not pass on the same straight line.

If a holding portion for positioning is composed of a penetrated hole, it is not necessary to process separately the holding portion for positioning of two or more prisms from the both sides of the holding component. In this case, since it becomes processed from one side, it can be processed so that an accuracy of position of the holding portion may become high.

If a holding component has an aperture stop having an opening corresponding to an effective diameter of an optical system, the holding component can be composed as a common component of each prism. Thereby, the number of parts can be is reduced in the whole optical apparatus. That is, since it leads also to reduction of the number of processes in assembling, a cheap apparatus can be offered.

In the decentering optical system of the present invention and its holding structure, it is desirable to satisfy the following condition (1).

$$0.2 \text{ mm} < t/H < 0.8 \text{ mm} \tag{1}$$

where t represents a height of the positioning portion and H represents a wall thickness of the holding component.

If it is less than the lower limit of the condition (1), the positioning portion becomes small too much and a prism cannot be held with sufficient accuracy.

On the other hand, if it exceeds the upper limit of the condition (1), the positioning portion becomes large too much and miniaturization of the whole optical system cannot be achieved.

Furthermore, it is desirable to satisfy the following condition (1').

$$0.4 \text{ mm} < t/H < 0.6 \text{ mm} \tag{1'}$$

In the decentering optical system according to the present invention and its holding structure, it is desirable that the three projected portions are asymmetrically arranged on the optically functional surface. If projected portions are asymmetrically arranged on an optically functional surface, it becomes possible to make a portion outside the effective diameter of the optically functional surface smaller. Thus, a miniaturization about the whole optical system becomes possible. It is good enough that at least two projected portions out of plural projected portions are arranged at positions which are longer (far distant) position than the distance which is the distance to the positioning portion, when it is compared by a distance from the center position of the optically functional surface (an effective diameter portion).

Hereafter, embodiments of the present invention will be explained using drawings.

The First Embodiment

Figure 2:
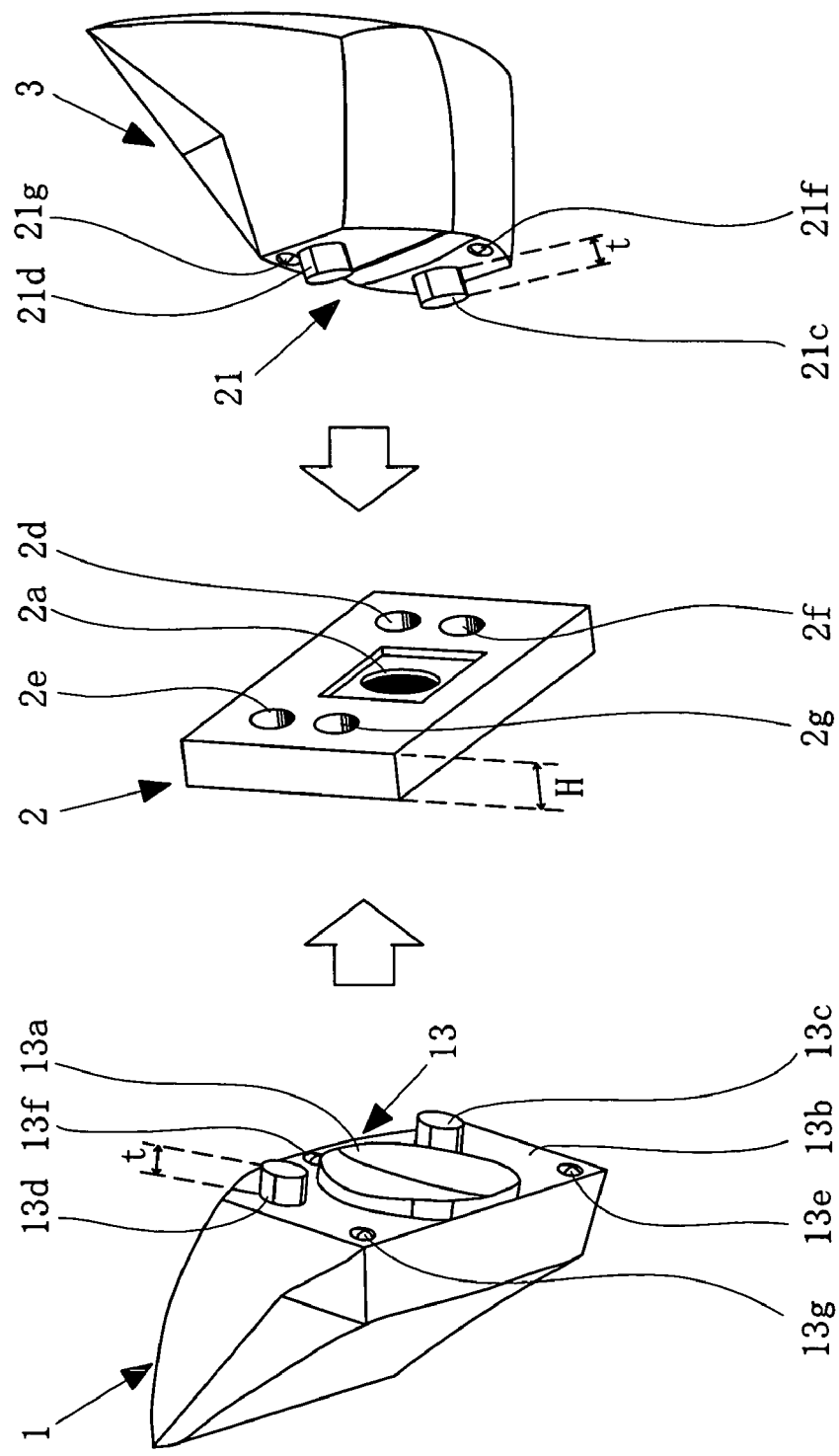
FIG. 2 is an exploded perspective view showing a decentering optical system and a holding structure of the decentering optical system concerning the first embodiment of the present invention.
Figure 3:
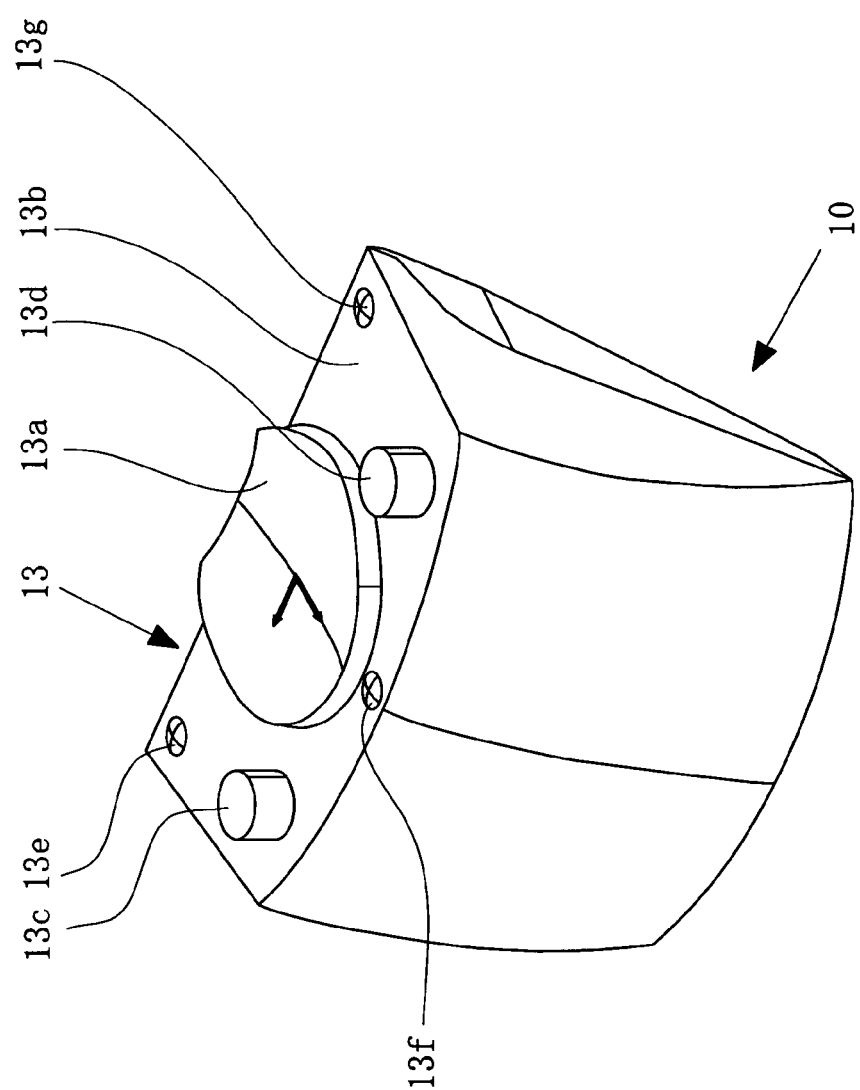
FIG. 3 is an enlarged perspective view showing a composition of an optically functional surface (an exit surface) which touches the holding component of the first prism of the decentering optical system in FIG. 2.
Figure 4:
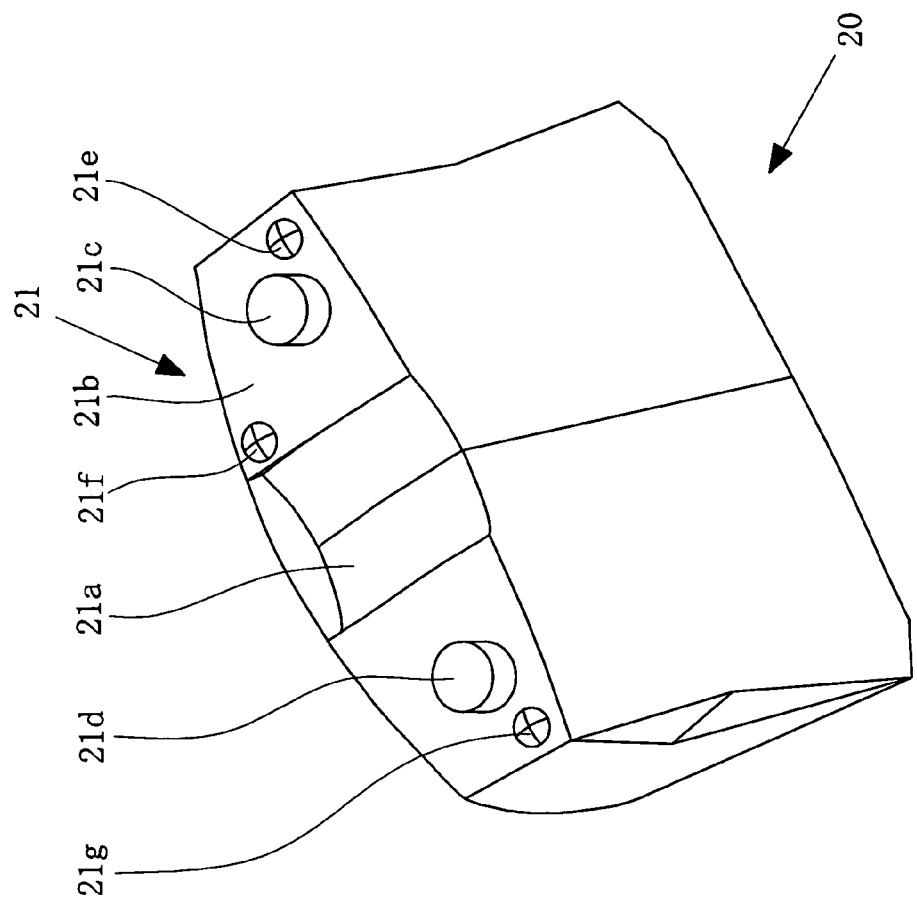
FIG. 4 is an enlarged perspective view showing a composition of an optically functional surface (an incident surface) which touches the holding component of the second prism of the decentering optical system in FIG. 2.
Figure 5A:
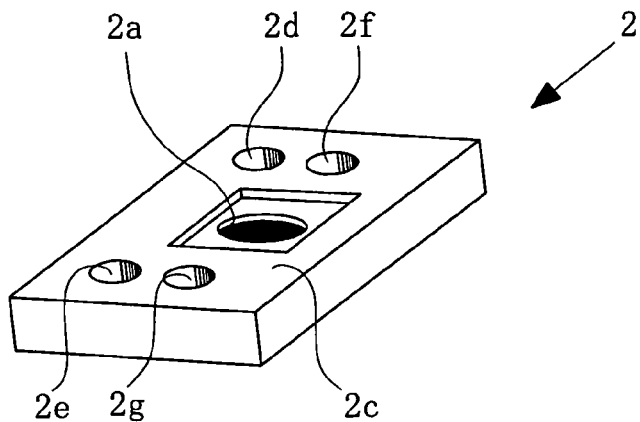
FIGS. 5A, 5B, and 5C are drawings showing a holding component in the decentering optical system of FIG. 2, which are a perspective view seen from the second prism side, an enlarged plane view from the first prism side, and an enlarged plane view from the second prism side, respectively.
Figure 5B:
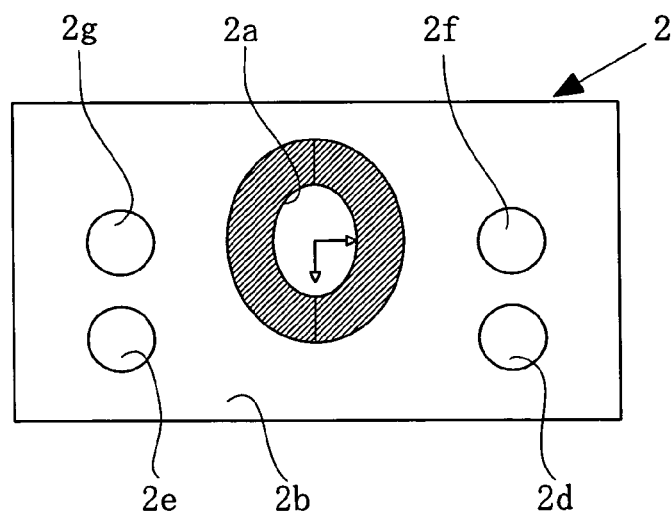
Figure 5C:
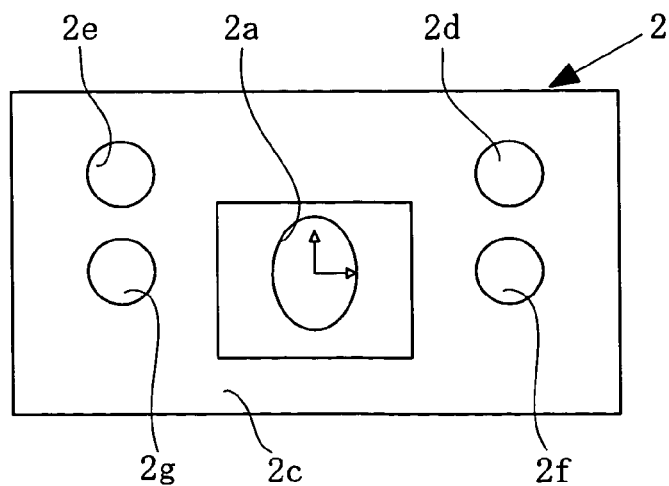
Figure 6:
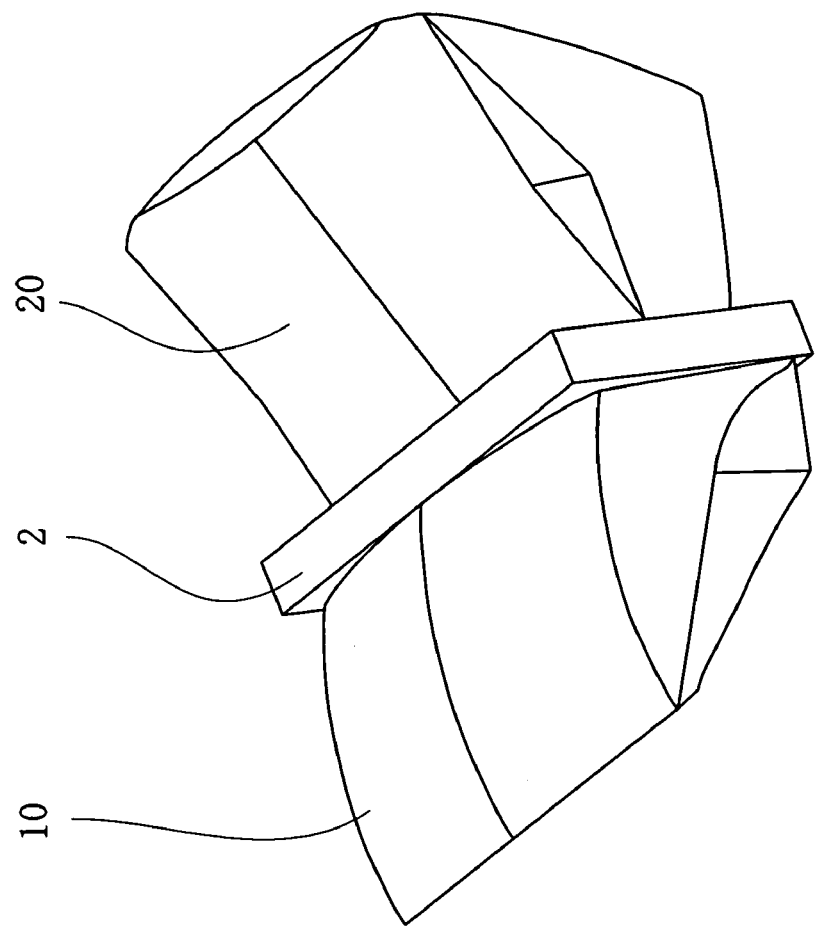
FIG. 6 is a perspective view showing a state where fixing for positioning of the first and the second prisms in a decentering optical system of FIG. 2 to a holding component has been made.
Figure 7:
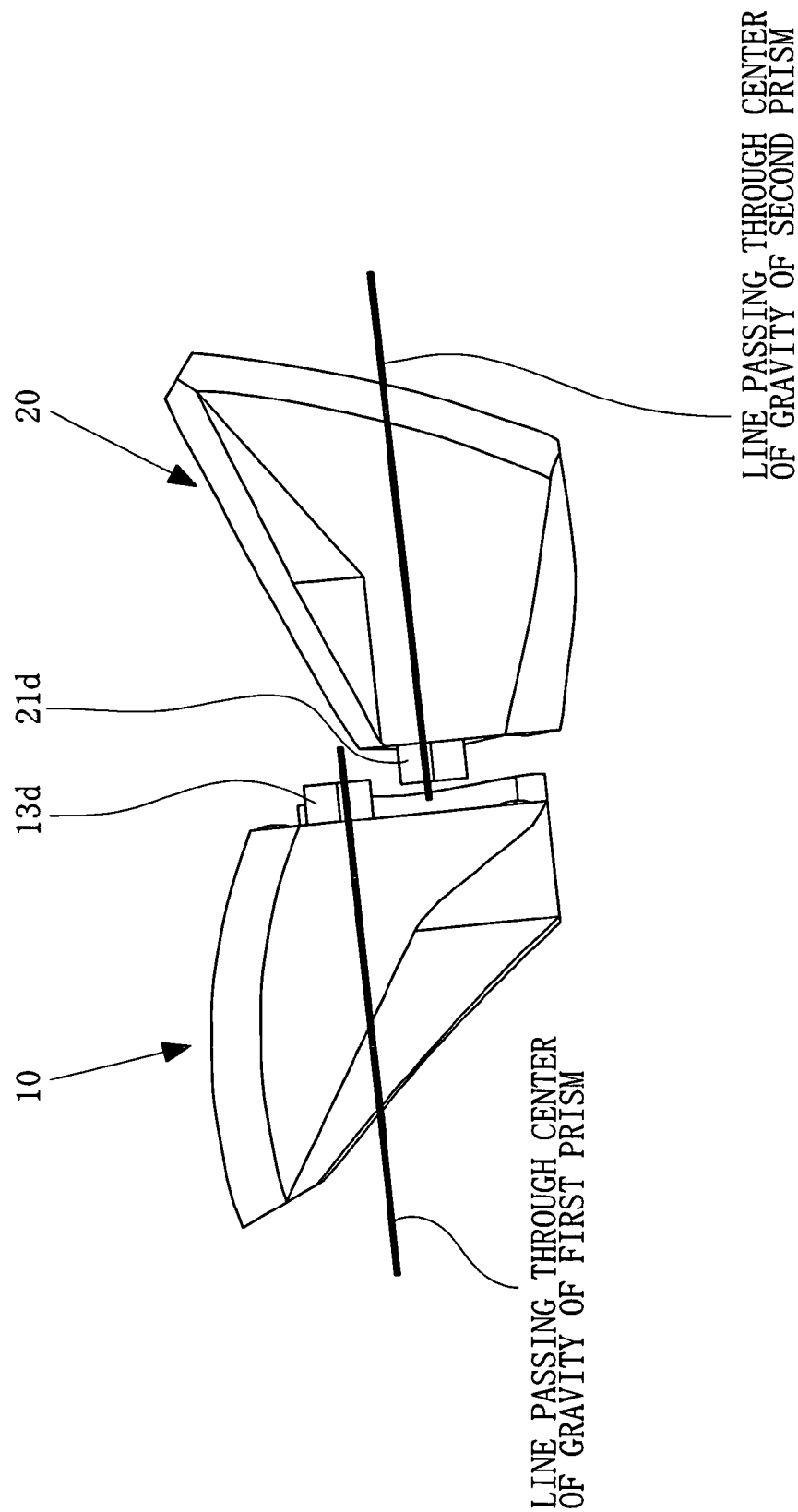
FIG. 7 is an explanatory diagram showing a position of the straight line which passes though each center of gravity of the first prism and the second prism in a state of FIG. 6.

FIG. 1 is a sectional view developed along an optical axis showing an example of a decentering optical system to which each holding structure of the present invention is applied. FIG. 2 is an exploded perspective view showing a decentering optical system and a holding structure of the decentering optical system concerning the first embodiment of the present invention. FIG. 3 is an enlarged perspective view showing a composition of an optically functional surface (an exit surface) which touches the holding component of the first prism of the decentering optical system in FIG. 2. FIG. 4 is an enlarged perspective view showing a composition of an optically functional surface (an entrance plane) which touches the holding component of the second prism of the decentering optical system in FIG. 2. FIGS. 5A, 5B, and 5C are drawings showing a holding component in the decentering optical system of FIG. 2, which are a perspective view seen from the second prism side, an enlarged plane view from the first prism side, and an enlarged plane view from the second prism side, respectively. FIG. 6 is a perspective view showing a state where fixing for positioning of the first and the second prisms in a decentering optical system of FIG. 2 to a holding component has been made. FIG. 7 is an explanatory diagram showing a position of the straight line which passes through each center of gravity of the first prism and the second prism in a state of FIG. 6.

The decentering optical system of the first embodiment has a first prism 10, a holding component 2 having an aperture stop and a second prism 20, as shown in FIGS. 1 and 2. In these Figures, a reference numerical 1 represents an optical axis, a reference numerical 2 represents an image surface, and reference numericals 4 and 5 are a cover glass or a filter. As shown in FIG. 1, the first prism 10 is composed of a decentering prism which has an incident surface 11, a rotationally asymmetric reflecting surface 12 and an exit surface 13. The exit surface 13 of the first prism 1 has a plane portion 13*b*, as shown in FIG. 3. This plane portion 13*b* is formed in a plane shape at the outside area of an effective diameter portion 13*a*. The plane portion 13*b* has two positioning portions 13*c* and 13*d* formed cylindrical, and three projected portions 13*e*, 13*f* and 13*g* formed in the hemisphere surface shape. The positioning portions 13*c* and 13*d* are formed at the outside position of the effective diameter portion 13*a*. In FIG. 2, the effective diameter portion 13*a* is arranged between the positioning portions 13*c* and 13*d*, which are arranged so as to be faced. The projected portions 13*e* and 13*g* are arranged so as to sandwich the effective diameter portion 13*a*. These projected portions 13*e* and 13*g* are arranged at furthermore outside position than positioning portions 13*c* and 13*d*. Therefore, distances between the projected portions 13*e* or 13*g* and the center portion of the effective diameter portion 13*a* are longer than the distances from the projected portions 13*c* or 13*d* to the center portion of the effective diameter portion 13*a* when compared the distances from the center position of effective diameter portion 13*a*. A projected portion 13*f* is arranged at the outside of the effective diameter portion 13*a*. The projected portion 13f is arranged at a position (a position nearer the effective diameter portion 13a) inside of the positioning portions 13c and 13d. In this way, at least two projected portions out of three projected portions are arranged at positions which are longer (more distant) than a distance between the positioning portion and the center position of an effective diameter portion, in comparison with a distance from the center position of an effective diameter portion.

As shown in FIG. 1, a second prism 20 is composed of a decentering prism which have an incident surface 21, a reflecting surface 22, a reflecting surface 23 and an exit surface 23. At least one of the reflecting surface 22 and the reflecting surface 23 is formed in rotationally asymmetric surface. The incident surface 21 of the second prism 20 has plane portion 21b. The plane portion 21b is formed in shape of plane at the outside area of the effective diameter portion 21a, as shown in FIG. 4. Plane part 21b has two positioning parts 21c and 21d formed cylindrical, and three projected portions 21e, 21f, and 21g formed to be a hemisphere surface. Positioning portions 21c and 21d are arranged so as to sandwich the effective diameter portion 21a between them that the effective diameter portion 21a may be disposed between them. These positioning portions 21c and 21d are arranged at the outside position of the effective diameter portion 21a. Projected portions 21e and 21g are arranged so as to sandwich the effective diameter portion 21a between them. These projected portions 21e and 21g are arranged at further outside position than positioning portions 21c and 21d. A projected portion 21f is arranged at the outside of the effective diameter portion 21a. The projected portion 21f is arranged at the position inside positioning portions 21c and 21d (a position nearer the effective diameter portion 21a). The projected portions 21e, 21f, and 21g are asymmetrically arranged on the incident surface 21.

As shown in FIG. 5A to FIG. 5C, the holding component 2 has an opening 2a composed to correspond with the effective diameter of the optically functional surfaces of two prisms 10 and 20.

The holding component 2 has plane portions 2b and 2c on its both surfaces. The plane portions 2b and 2c are formed to be plane shape at the outside of an opening 2a. Holding portions for positioning 2d, 2e, 2f, and 2g are formed on the plane portions 2b and 2c.

The holding portions for positioning are arranged at the positions corresponding to the positioning portions 13c, 13d, 21c and 21d of the first and second prisms 10 and 20. The holes of the holding portion for positioning are formed as a penetrated hole into which fitting can be performed according to the shape of these positioning portions. When H represents a wall thickness of the holding component 2, and t represents a width of the positioning portion of the first and second prisms 10 and 20, it is designed to set as H=1.12 mm, t=0.55 mm and t/H=0.49.

In the first embodiment composed in this way, the first prism 10 is made fitted into the holding component 2, from the side of the plane portion 2b of the holding component 2, by fitting the positioning portion 13c into the holding portion for positioning 2e and by fitting the positioning portion 13d into the holding portion for positioning 2e, respectively. By this, the position of the first prism 10 is determined. At this time, the inclination of the first prism 10 to the holding component 2 is determined by such that the projected portions 13e, 13f and 13g of the first prism 10 are touched the plane portion 2b of the holding component 2. Similarly, the second prism 20 is made fitted into the holding component 2, from the side of the plane portion 2c of the holding component 2, by fitting the positioning portion 21c into the holding portion for positioning 2f and by fitting the positioning portion 21d into the holding portion for positioning 2g, respectively. By this way, the position of the second prism 20 is determined. At this time, the inclination of the first prism 20 to the holding component 2 is determined by such that the projected portions 21e, 21f and 21g of the first prism 20 are touched the plane portion 2c of the holding component 2.

Thus, as shown in FIG. 6, the first prism 10 and the second prism 20 are held at the both sides of the holding component 2. As show in FIG. 7, the holding portions for positioning 2d and 2e, and the holding portions for positioning 2f and 2g are arranged at different position respectively, so that a straight line passing along the center of gravity of the positioning portion of the first prism 10 and a straight line passing through the center of gravity of the second prism 20 may not meet on the same straight line on the holding component 2.

In the state shown in FIG. 6, adjustment of the inclination of the first prism 10 and the second prism 20 to the holding component 2 may be needed. In such case, a necessary amount of the projected portions 13e, 13f, and 13g of the first prism 10, and the projected portions 21e, 21f, and 21g of the second prism 20 can be cut off according to direction and degree of inclination. In this way, the inclination of the prisms 10 and 20 can be adjusted easily.

The Second Embodiment

Figure 8:
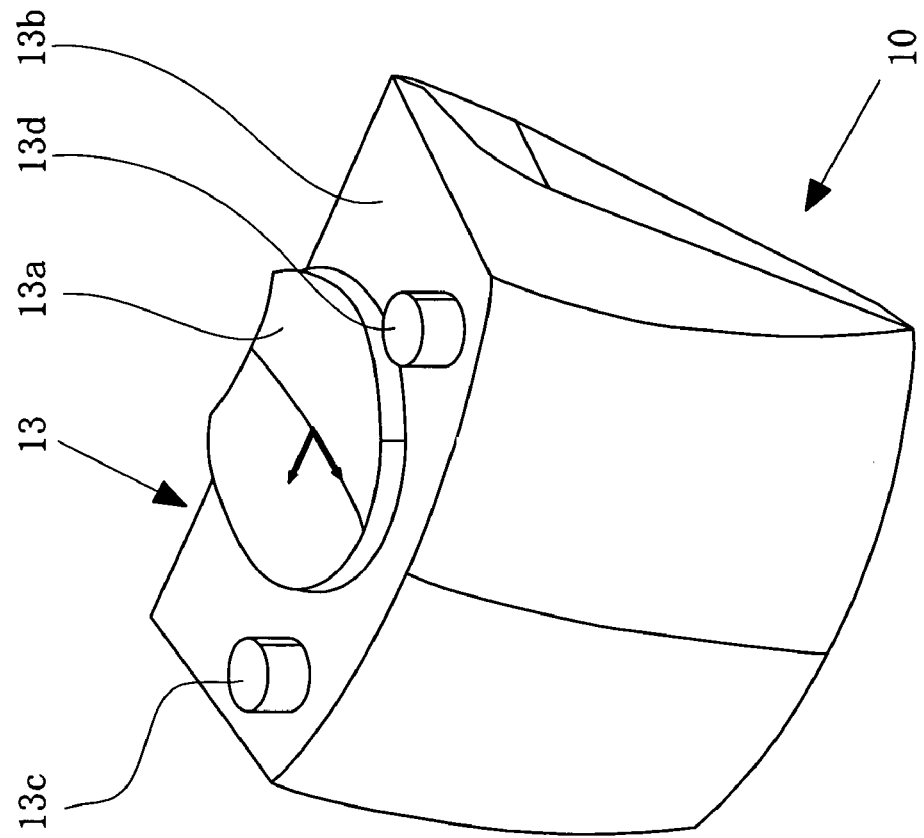
FIG. 8 is an enlarged perspective view showing a composition of an optically functional surface (an exit surface) which touches a holding component of the first prism in a decentering optical system concerning the second embodiment of the present invention.
Figure 9:
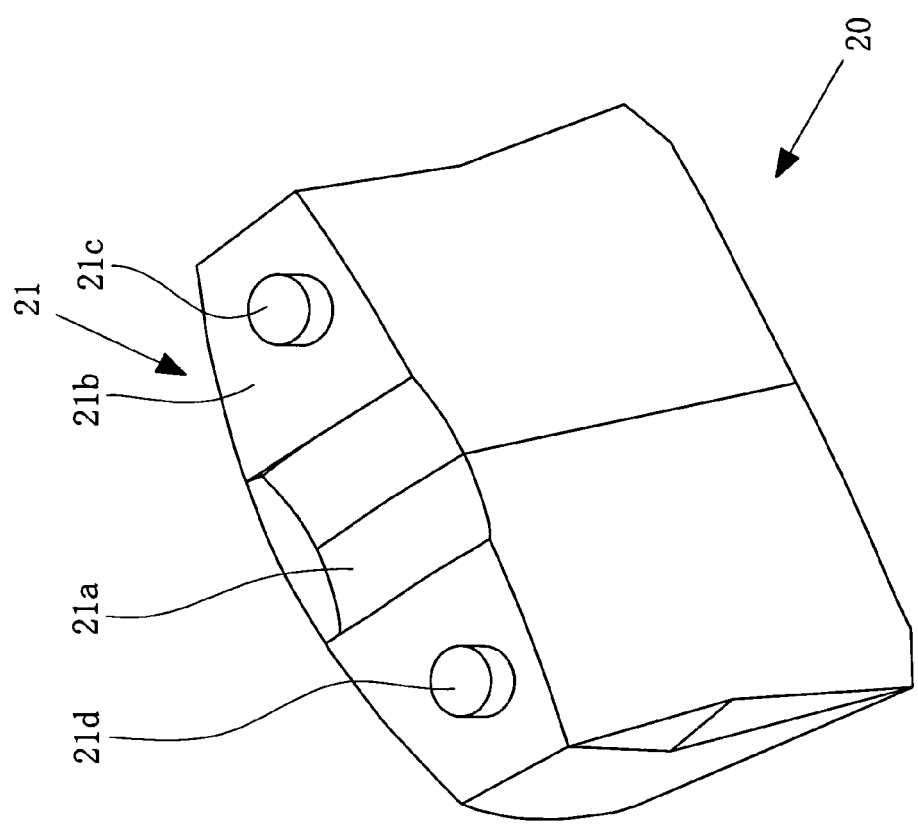
FIG. 9 is an enlarged perspective view showing a composition of an optically functional surface (an incident surface) which touches a holding component of the second prism in a decentering optical system concerning the second embodiment of the present invention.
Figure 10A:
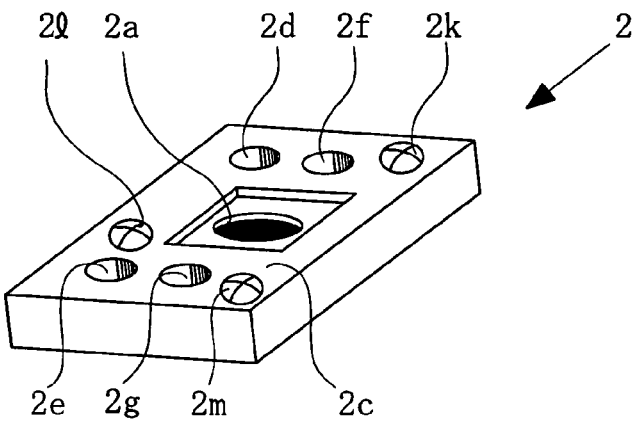
FIGS. 10A, 10B, and 10C are drawings showing a holding component in a decentering optical system concerning the second embodiment of the present invention, which are a perspective view seen from the second prism side, an enlarged plane view seen from the first prism side, and an enlarged plane view seen from the second prism side, respectively.
Figure 10B:
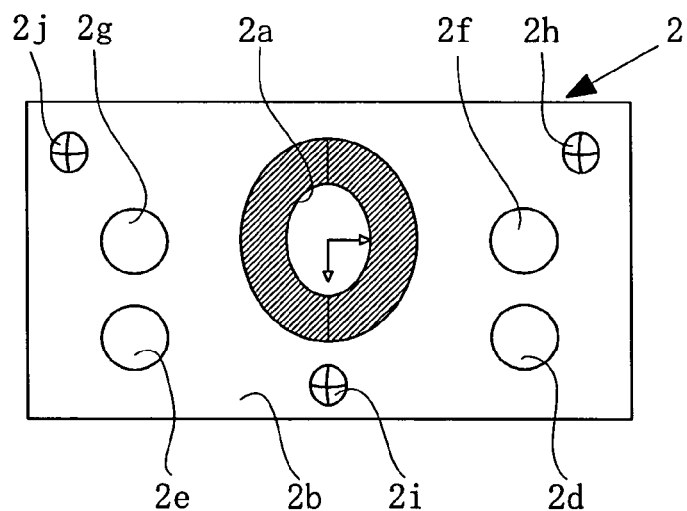
Figure 10C:
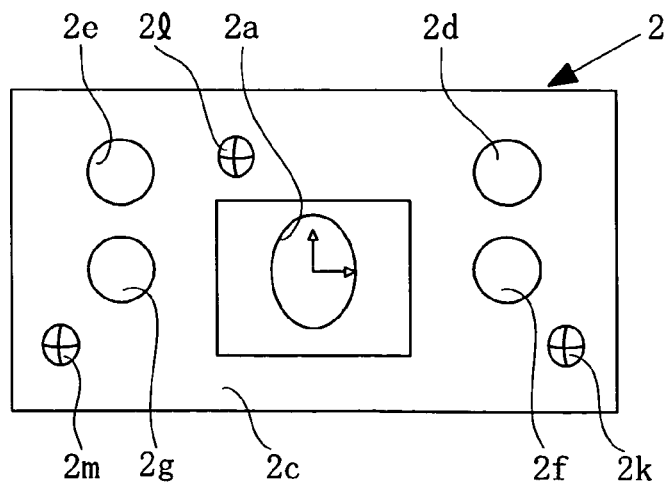

FIG. 8 is an enlarged perspective view showing a composition of an optically functional surface (an exit surface) which touches a holding component of the first prism in a decentering optical system concerning the second embodiment of the present invention. FIG. 9 is an enlarged perspective view showing a composition of an optically functional surface (an incident surface) which touches a holding component of the second prism in a decentering optical system concerning the second embodiment of the present invention. FIG. 10 is a drawing showing a holding component in a decentering optical system concerning the second embodiment of the present invention. FIG. 10A is a perspective view seen from the second prism side. FIG. 10B is an enlarged plane view seen from the first prism side, and FIG. 10C is an enlarged plane view seen from the second prism side, respectively.

As shown in FIG. 1, the decentering optical system of the second embodiment has a first prism 10, a holding component 2 having an aperture stop and a second prism 20. In FIG. 1, a reference numerical 3 represents an image surface. Reference numericals 4 and 5 represent a cover glass or a filter. The first prism 10 is composed of a decentering prism which has an incident surface 11, a rotationally asymmetric reflecting surface 12 and an exit surface 13. As shown in FIG. 8, the exit surface 13 of the first prism 1 has a plane portion 13b, which is formed in a plane shape at the outside area of an effective diameter portion 13a. The plane portion 13b has two positioning portions 13c and 13d formed to be cylindrical shape. The positioning portions 13c and 13d are arranged at outside positions which sandwich the effective diameter portion 13a.

As shown in FIG. 1, the second prism 20 is composed of a decentering prism which has an incident surface 21, a reflecting surface 22, a reflecting surface 23 and an exit surface 24. At least one of the reflecting surface 22 and the reflecting surface 23 is formed to be a rotationally asymmetric surface. As shown in FIG. 9, the incident surface 21 of the second prism 20 has a plane portion 21b which is formed in shape of plane at the outside area of the effective diameter portion 21a. Plane portion 21b has two positioning portions 21c and 21d formed cylindrical shape. The positioning portions 21c and 21d are arranged at the outside positions which sandwich the effective diameter portion 21a.

As shown in FIG. 10, the holding component 2 has an opening 2a composed so as to correspond to the effective diameter of the optically functional surfaces of two prisms 10 and 20.

The holding component 2 has plane portions 2b and 2c, which are formed to be plane shape at the outside of an opening 2a. The plane portions 2b and 2c have holding portions 2d, 2e, 2f and 2g for positioning. Each of the holding portions for positioning is formed as a hole at the position corresponding to the positioning portions 13c, 13d, 21c and 21d of the first and second prisms 10 and 20. Each of the holes is formed as a penetrated hole into which fitting can be performed according to the shape of these positioning portions.

Three projected portions 2h, 2i and 2j having a hemisphere surface are formed on the plane portion 2b.

The projected portions 2h and 2j are formed in predetermined positions of the plane portion 2b (namely, positions outside the holding portions for positioning 2f and 2g). These predetermined positions are positions which sandwich the effective diameter portion 13a. These predetermined positions are positions which touch the first prism 10 at the outside of the positioning portions 13c and 13c when the first prism 10 is held.

The projected portion 2i is arranged at another predetermined position on the plane portion 2b (namely, a position inside of the holding portions for positioning 2f and 2g). This another predetermined position is at the outside of the effective diameter portion 13a. This another predetermined position is a position which the first prism 10 touches at the inside of the positioning portions 13c and 13d when the first prism 10 is held.

On the plane portion 2c, three projected portions 2k, 21 and 2m 13e, are formed in the hemisphere surface shape.

The projected portions 2k and 2m are formed at the predetermined positions of the plane portion 2b (positions outside the holding portions for positioning 2d and 2e). These predetermined positions are positions which sandwich the effective diameter portion 21a. These predetermined positions are positions which touch the first prism 20 at the outside of the positioning portions 21c and 21c when the first prism 20 is held.

The projected portion 21 is arranged at another predetermined position on the plane portion 2b (namely, a position inside of the holding portions for positioning 2d and 2e). This another predetermined position is at the outside of the effective diameter portion 21a. This another predetermined position is a position which the first prism 20 touches at the inside of the positioning portions 21c and 21d when the first prism 20 is held. Projected portions 2k, 21 and 2m are asymmetrically arranged on the incident surface 2c.

The second embodiment is also designed as well as the first embodiment. When H represents a wall thickness of the holding component 2, and t represents a width of the positioning portion of the first and second prisms, it is designed to set as H=1.12 mm, t=0.55 mm and t/H=0.49. In the second embodiment composed in this way, the first prism 10 is made fitted into the holding component 2, from the side of the plane portion 2b of the holding component 2, by fitting the positioning portion 13c into the holding portion for positioning 2e and by fitting the positioning portion 13d into the holding portion for positioning 2e, respectively. By this, the position of the first prism 10 is determined. At this time, the inclination of the first prism 10 to the holding component 2 is determined by such that the projected portions 2h, 2i and 2j of the first prism 10 are touched the plane portion 13b of the holding component 2. Similarly, the second prism 20 is fitted into the holding component 2 from the side of the plane portion 2c of the holding component 2, by such way that the positioning portion 21c is fitted into the holding portion 2f for positioning, and the positioning portion 21d is fitted into the holding portion 2g for positioning, respectively. By this, the position of the second prism 20 is determined. At this time, the inclination of the second prism 20 to the holding component 2 is determined by such that the projected portions 2k, 21 and 2m of the holding component 2 are touched the plane portion 21b of the prism 20.

Thus, like the first embodiment, as shown in FIG. 6, the first prism 10 and the second prism 20 are held at the both sides of the holding component 2. As show in FIG. 7, the holding portions for positioning 2d and 2e, and the holding portions for positioning 2f and 2g are arranged at different positions, respectively, so that a straight line passing along the center of gravity of the positioning portion of the first prism 10 and a straight line passing along the center of gravity of the second prism 20 may not meet on the same straight line on the holding component 2.

In the state shown in FIG. 6, adjustment of the inclination of the first prism 10 to the holding component 2 may be needed. In such case, a necessary amount of the projected portions 2h, 13f, and 13g of the first prism 10, and the projected portions 2h, 2i, and 2j of the holding component 2 can be cut off according to direction and degree of inclination. When an adjustment of an inclination of the second prism 20 to the holding component 2 is needed, a necessary amount of the projected portions 2k, 2l and 2m of the holding component 2 can be cut off according to direction and degree of inclination. In this way, the inclination of the prisms 10 and 20 can be adjusted easily.

In this way, according to the second embodiment, the inclination of the prisms can be easily adjusted at low cost since inclination of two or more prisms can be adjusted only by adjustment of a holding component.

Furthermore, it can be also composed such that a holding frame which holds and fixes an imaging element for positioning is movably mounted additionally on the holding structure of the decentering optical system of the first and the second embodiments.

Figure 11:
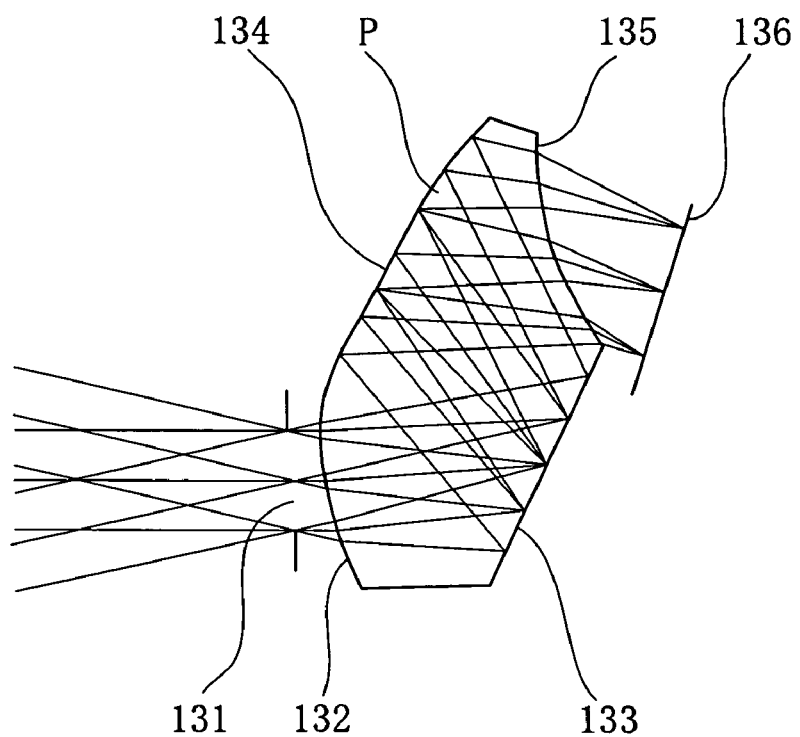
FIG. 11 is a drawing showing a modified example of a decentering prism which can be used for an imaging optical system of the present invention.

As a decentering prism arranged at both sides of the aperture stop of the present invention, widely-known, various type of decentering prisms of which the number of times of internal reflection is two times or more can be used, without limiting the decentering prism of which the number of times of internal reflection is one or two as shown as an example in FIG. 1. Examples of the prism will be shown below. As shown in FIG. 11, each example will be explained as a decentering prism P by which an image of an object located at a long distant position is formed on an image surface 136 via a pupil 131 by tracing light in forward direction. In case that the optical path is reversed direction, this can be also used as a decentering prism by which an image is formed on the side of the pupil 131 after a light enters from the side of the image surface 136

In case of FIG. 11, the decentering prism P is composed of a first surface 132, a second surface 133, a third surface 134 and a fourth surface 135. An incident light which comes through the incidence pupil 131 is refracted at the first surface 132 and enters into the decentering prism P, and it performs an internal reflection at the second surface 133, and then it performs an internal reflection at the third surface 134 so as to form an optical path like Z letter shape. Then it enters the fourth surface 135, where it is refracted and an image is formed on the image surface 36.

Figure 12:
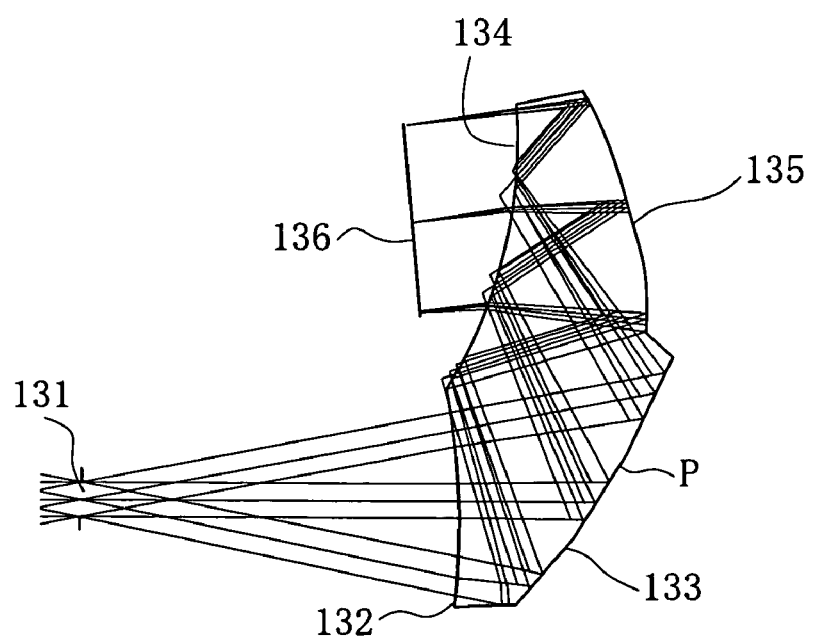
FIG. 12 is a drawing showing another modified example of the decentering prism.

In case of FIG. 12, a decentering prism P is composed of a first surface 132, a second surface 133, a third surface 134 and a fourth surface 135. An incident light which comes through the incidence pupil 131 is refracted by the first surface 132 and enters into the decentering prism P, and it performs an internal reflection at the second surface 133, then it performs a total reflection at the third surface 134. Then it enters the fourth surface 135 where it is internally reflected and enters again to the third surface 134 where it is refracted, and an image is formed on the image surface 36.

Figure 13:
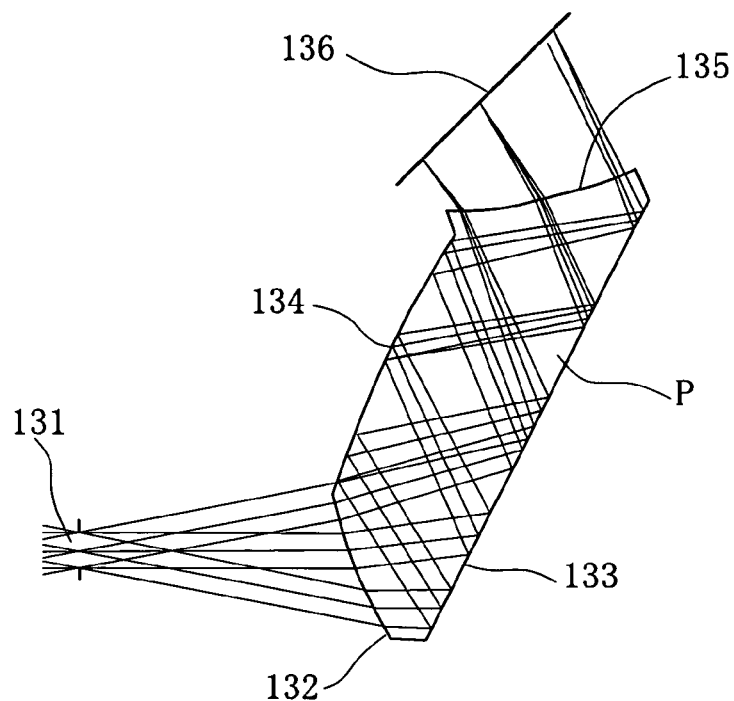
FIG. 13 is a drawing showing further other modified example of the decentering prism.

In the case of FIG. 13, the decentering prism P is composed of a first surface 132, a second surface 133, a third surface 134 and a fourth surface 135. An incident light which comes through the incidence pupil 131 is refracted by the first surface 132, and enters into the decentering prism P, and it performs an internal reflection at the second surface 133 and enters to the third surface 134, where it is internally reflected. Then it enters again to the second surface 133 where it is internally reflected and enters to the fourth surface 135, where it is refracted, and then an image is formed on the image surface 36.

Figure 14:
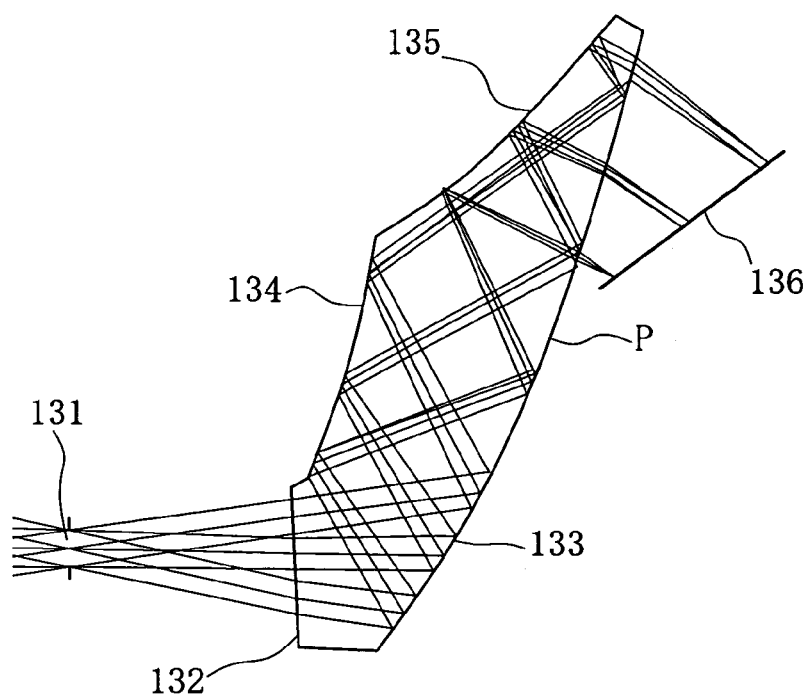
FIG. 14 is a drawing showing still furthermore other modified example of the decentering prism.

In the case of FIG. 14, the decentering prism P is composed of a first surface 132, a second surface 133, a third surface 134 and a fourth surface 135. An incident light which comes through an incidence pupil 131 is refracted at the first surface 132 and enters into the decentering prism P, and enters to the second surface 133, where it is internally reflected and then enters to the third surface 134, where it is internally reflected. Then it enters again to the second surface 133, where it is internally reflected and enters to the third surface 134, where it is internally reflected, and enters again to the second surface 133 where it is internally reflected, and enters again to the second surface 133, where it is internally reflected, and enters to the fourth surface 135, where it is internally reflected. Then, it enters again to the second surface 133, where it is refracted, and then an image is formed on the image surface 36

Figure 15:
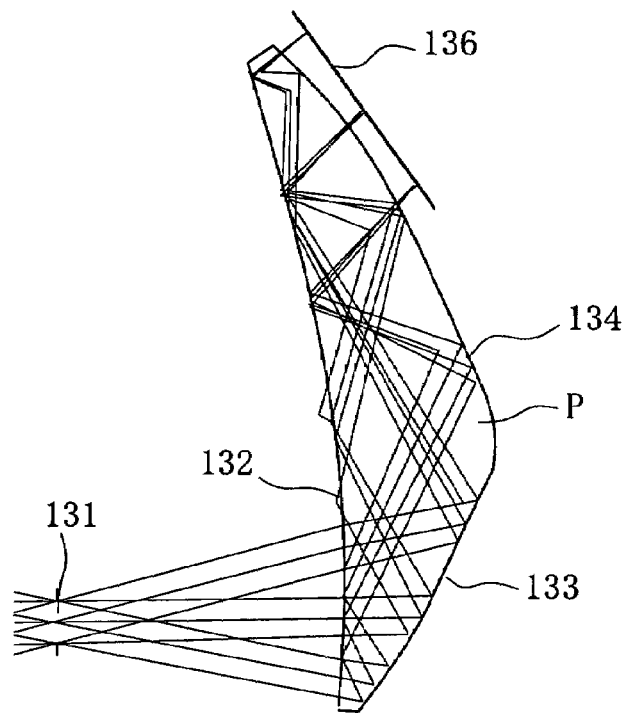
FIG. 15 is a drawing showing furthermore other modified example of the decentering prism.

In the case of FIG. 15, the decentering prism P is composed of a first surface 132, a second surface 133 and a third surface 134. An incident light which comes through an incidence pupil 131 is refracted at the first surface 132, and it enters into the decentering prism P, and then it performs an internal reflection at the second surface 133 and enters again to the first surface 132, where it is totally reflected, and then it is internally reflected at the third surface 134. Then, at the third time, it enters to the first surface 132, where it is totally reflected, and enters again to the third surface 134, where it is refracted and then an image is formed on an image surface 136.

Figure 16:
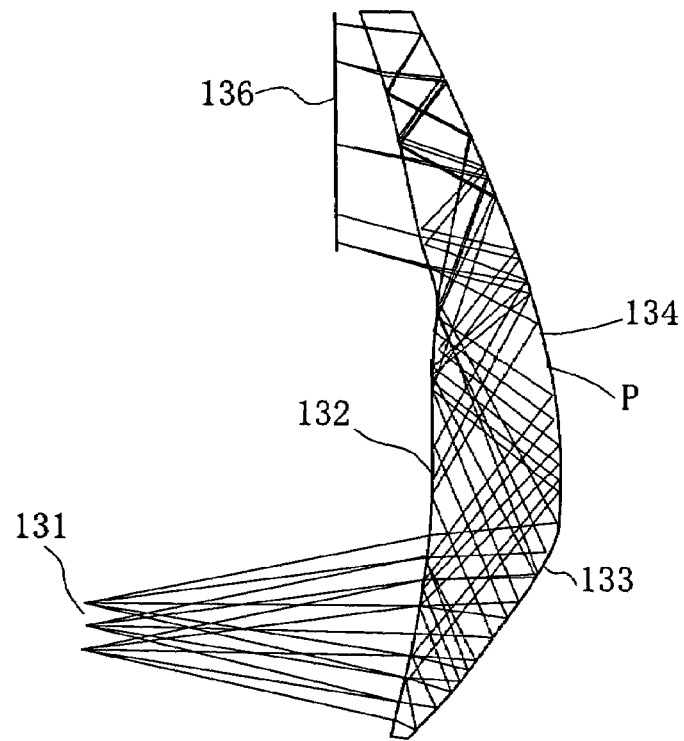
FIG. 16 is a drawing showing furthermore other modified example of the decentering prism.
Figure 17:
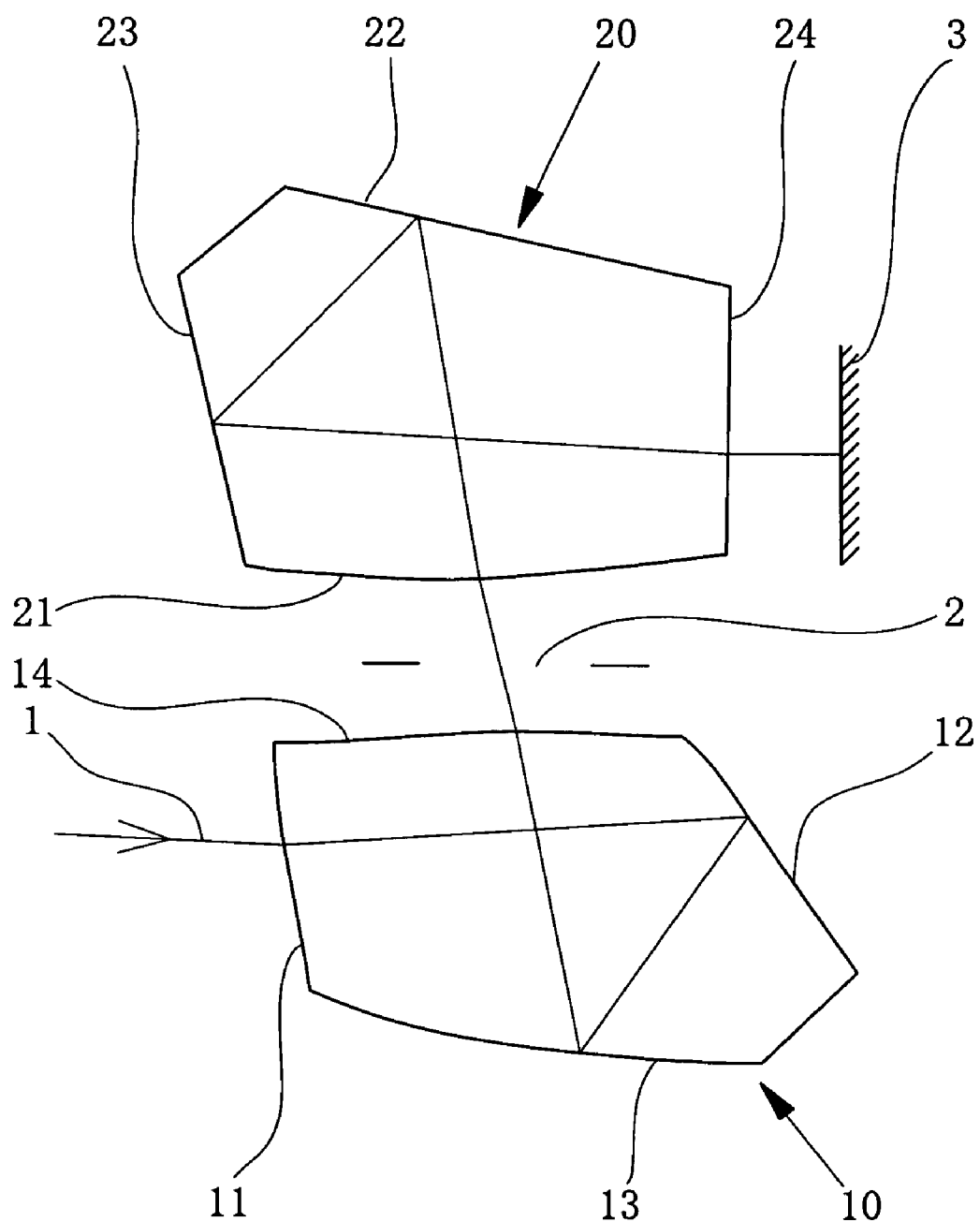
FIG. 17 is a drawing showing an example of an imaging optical system of the present invention which composes of combination of prisms different from the first embodiment and the second embodiment.

In the case of FIG. 16, the decentering prism P is composed of a first surface 132, a second surface 133 and a third surface 134. An incident light which comes through the incidence pupil 131 is refracted by the first surface 132, and it enters into the decentering prism P, and then it performs an internal reflection at the second surface 133, and then it enters again to the first surface 132, where it is totally reflected and then it is internally reflected at the third surface 134. Then, it enters at the third time to the first surface 132, where it is totally reflected and then it enters again to the third surface 134, where it is internally reflected. Then, it enters at the fourth time to the first surface 132, where it is refracted, and then an image is formed on an image surface 136.

Figure 18:
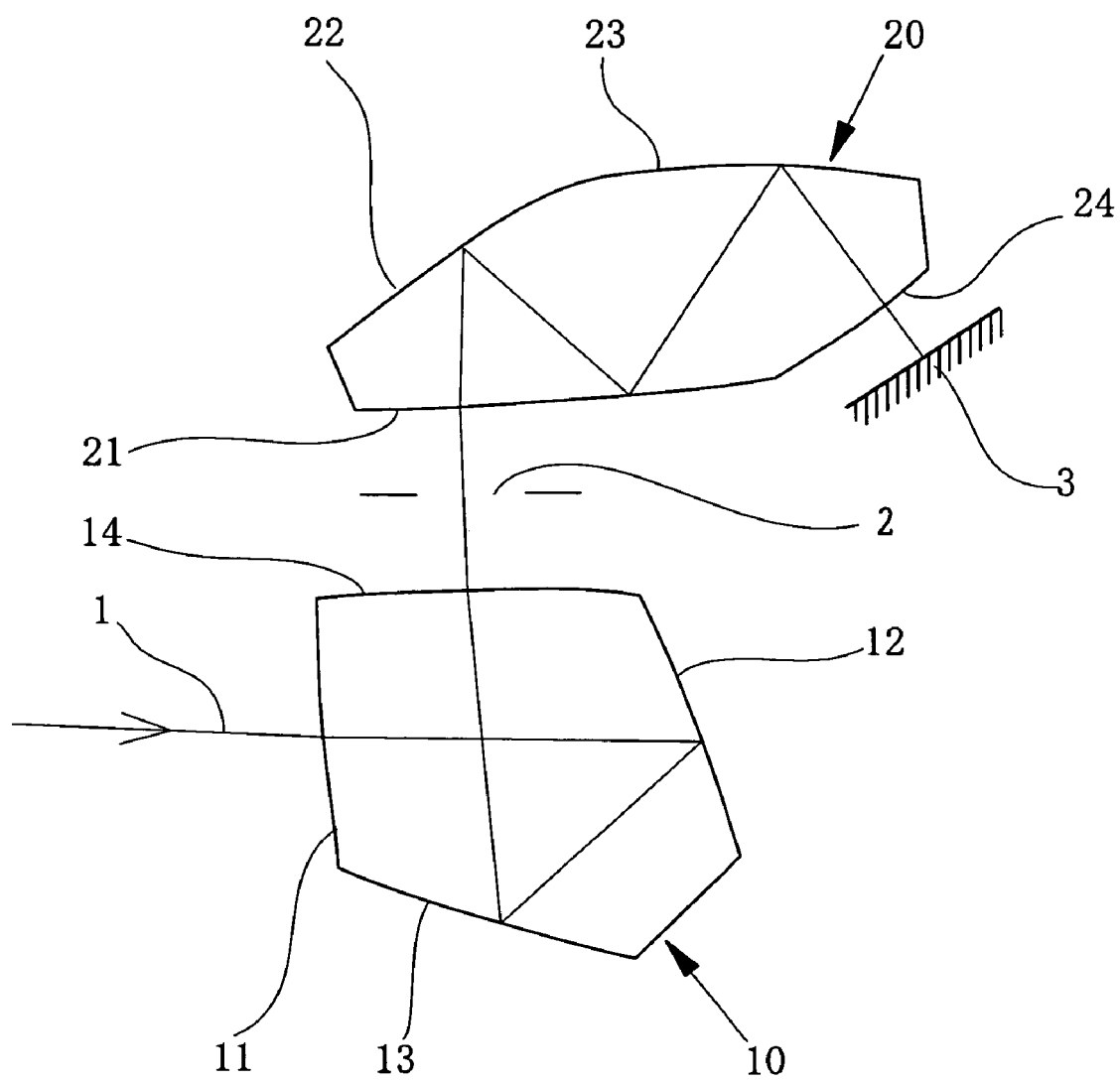
FIG. 18 is a drawing showing another example of an imaging optical system of the present invention which composes of combination of prisms different from the first embodiment and the second embodiment.
Figure 19:
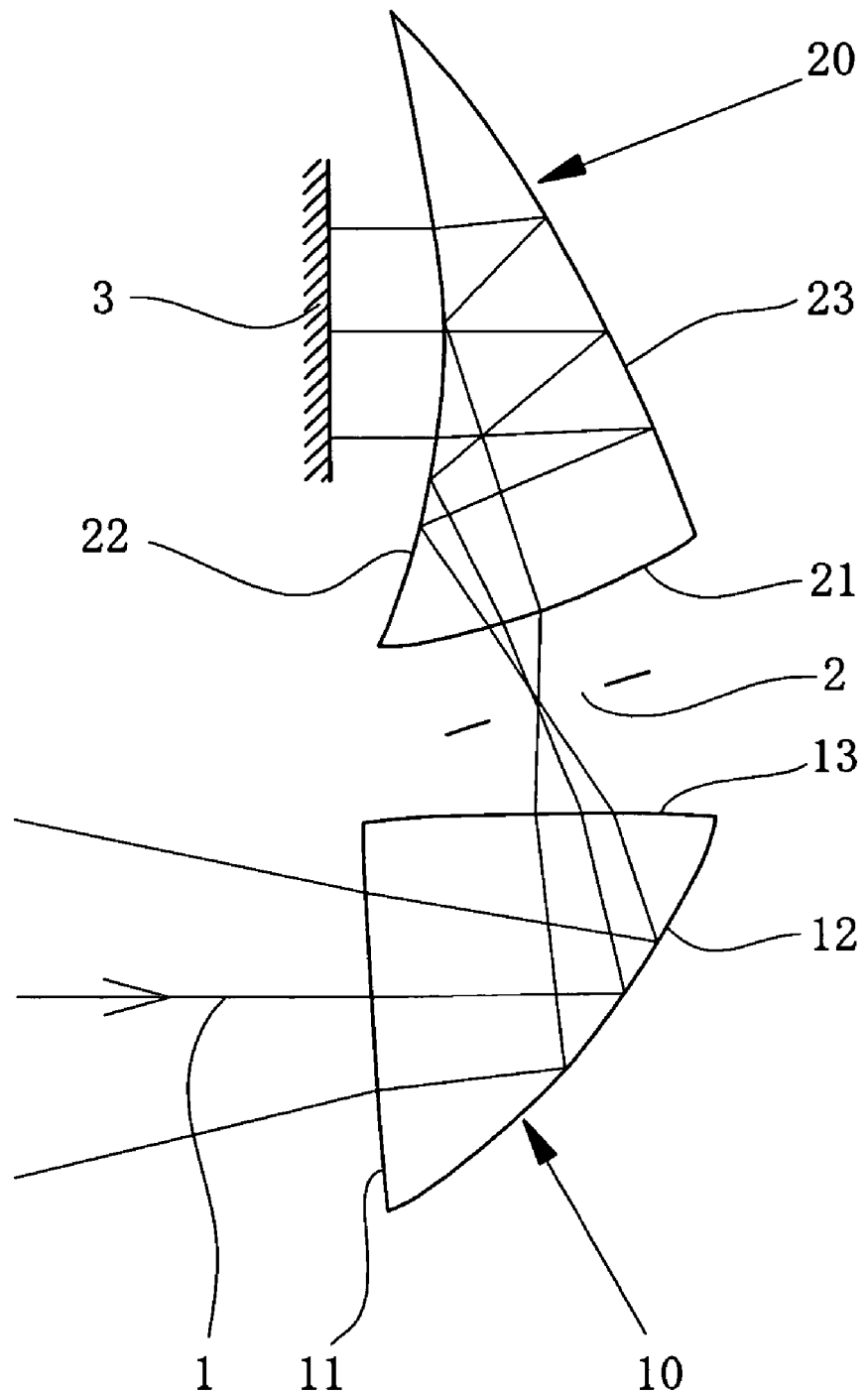
FIG. 19 is a drawing showing furthermore other example of an imaging optical system of the present invention which composes of combination of prisms different from the first embodiment and the second embodiment.
Figure 20:
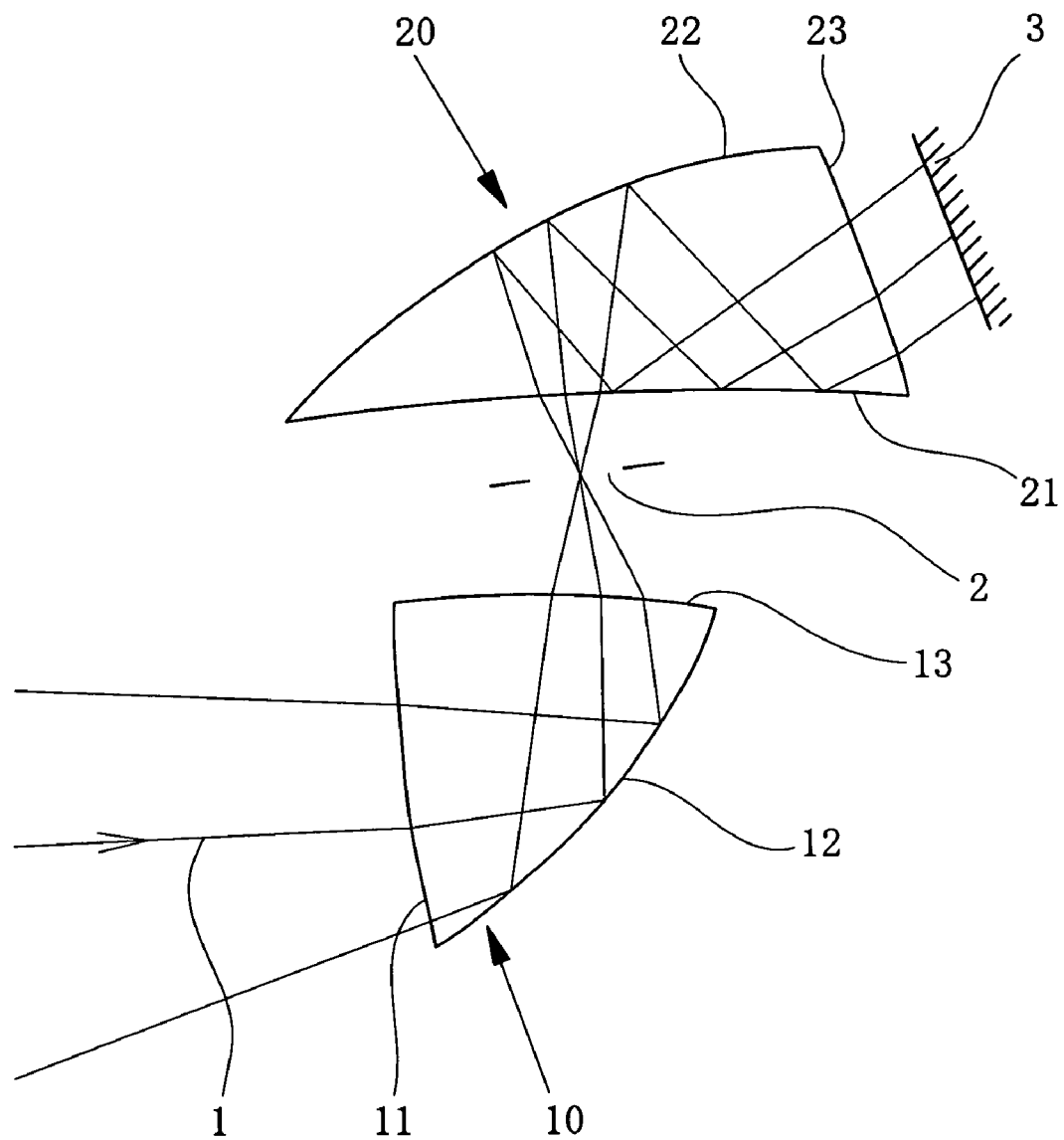
FIG. 20 is a drawing showing furthermore other example of an imaging optical system of the present invention which composes of combination of prisms different from the first embodiment and the second embodiment.
Figure 21:
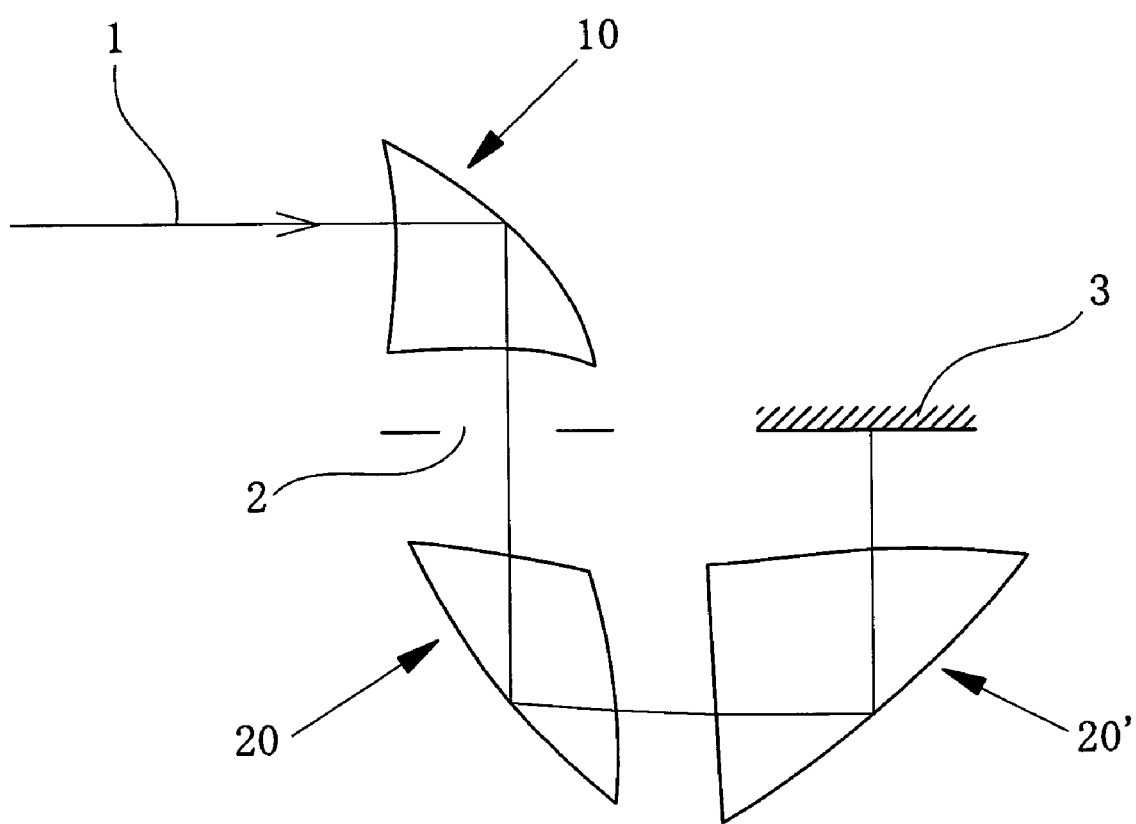
FIG. 21 is a drawing showing still furthermore other example of an imaging optical system of the present invention which composes of combination of prisms different from the first embodiment and the second embodiment.

Furthermore, it may be composed of such as a second prism 20 in FIG. 18 shown later, which is composed of a first surface 21 to a fourth surface 24 where reflection is performed three times in the prism. Or it may be composed of such as a second prism 20 shown in FIG. 19 shown later, which is composed of a first surface 21 to a third surface 23 where reflection is performed twice in the prism, and its second surface 22 is used commonly for a total reflection surface as well as an exit surface. Or as a second prism 20 in FIG. 20 shown later, it can be is composed of a first surface 21 to a third surface 23 where reflection is performed twice in a prism, and its first surface 21 is used commonly for a total reflection surface and an exit surface. These can be used as a decentering prism at front side or a rear side of an aperture stop 2.

In the following FIGS. 17 to 21, an imaging optical system according to the present invention, which has a combination of prisms different from the cases shown in the first embodiment and the second embodiment is shown. However, digital data has been omitted.

The decentering optical system having the holding structure according to the present inventions mentioned above can be used for the photographing apparatus, particularly for a camera, in which a photographing is performed by forming an object image, which is received on an imaging element, such as CCD or silver halide film. This can be used as an observation apparatus which observes an object image through an eyepiece, especially as an objective optical system of a finder part of a camera. This can be also used as an imaging optical system for optical equipment using small imaging element of an endoscope and the like. Such embodiments will be shown as follows.

Figure 22:
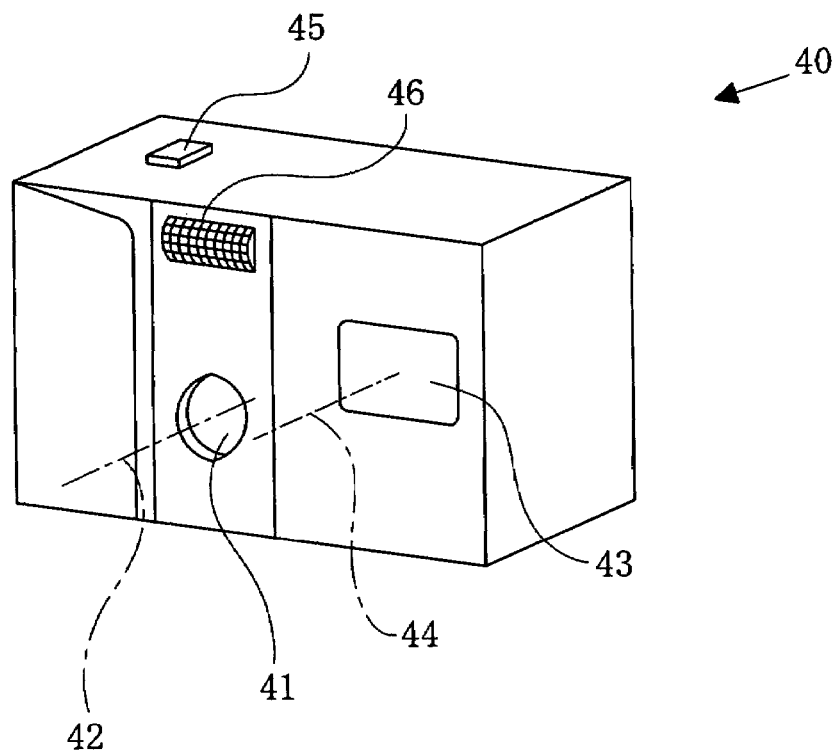
FIG. 22 is a front perspective view showing an external appearance of an electronic camera to which a decentering optical system having a holding structure of the present invention has been applied.
Figure 23:
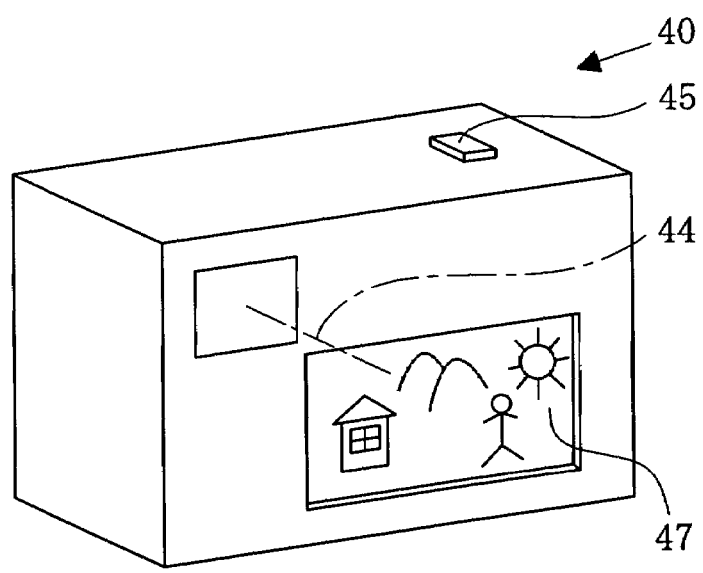
FIG. 23 is a back perspective view of an electronic camera of FIG. 22.
Figure 24:
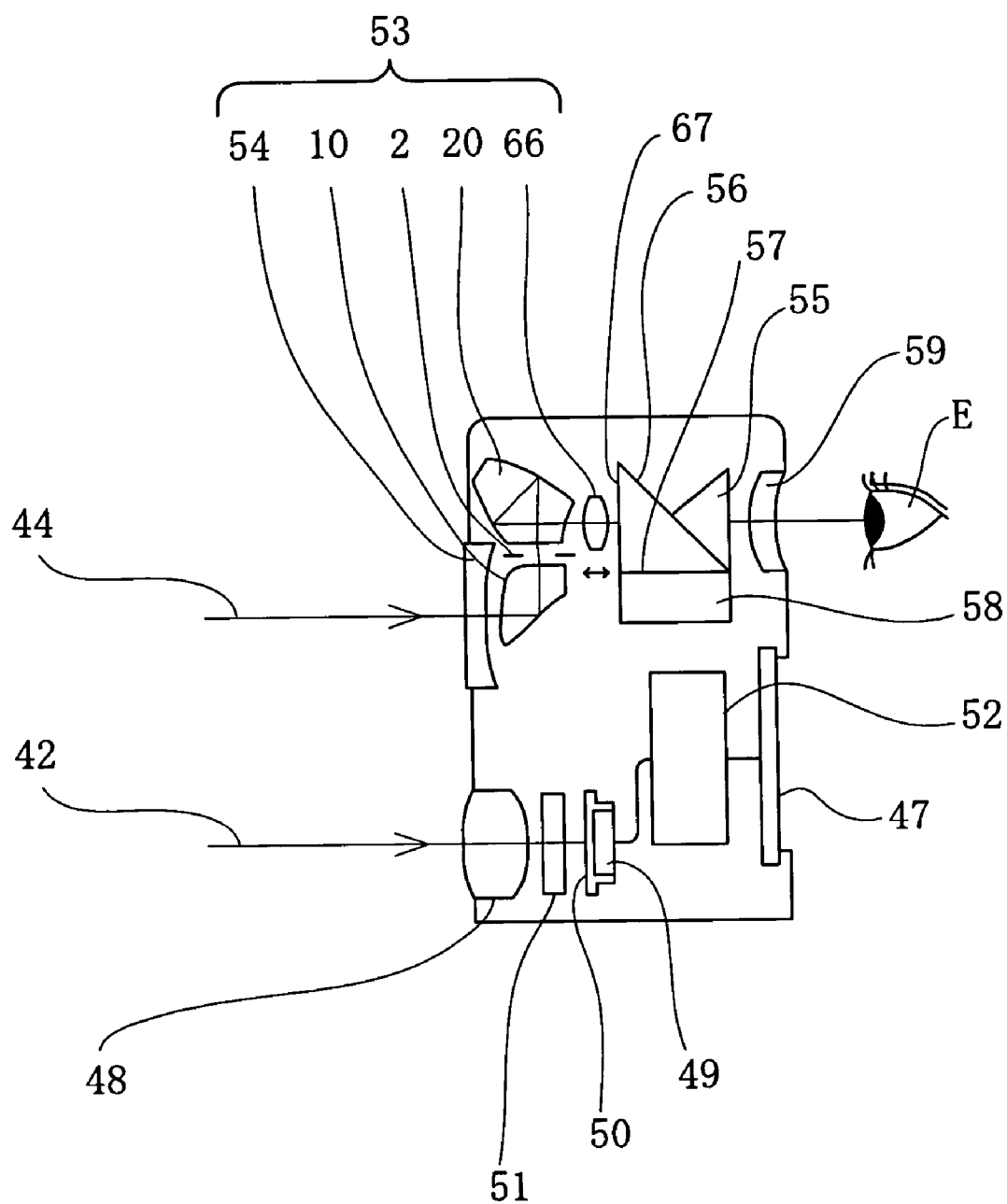
FIG. 24 is a sectional drawing showing the composition of the electronic camera of FIG. 22.

FIGS. 22 to 24 are conceptual diagrams showing composition in which a decentering optical system having the holding structure according to the present invention is incorporated in an objective optical system of the finder portion of an electronic camera. FIG. 22 is a front perspective view showing an external appearance of an electronic camera 40, FIG. 23 is a back perspective view of the electronic camera and FIG. 24 is a sectional drawing showing the composition of the electronic camera 40. In this example, the electronic camera 40 comprises a photographing optical system 41 which has an optical path 42 for taking photograph, a finder optical system 43 which has an optical path 44 for finder, a shutter button 45, a flash 46 and a liquid crystal display monitor 47, etc. When the shutter button 45 arranged on the camera 40 is pressed, in responding such action, photographing is performed through an objective optical system 48 for photographing. An object image formed by the objective optical system 48 for photographing is formed on an imaging surface 50 of CCD 49 through filters 51, such as a low pass filter, an infrared cut filter and the like. The object image received by this CCD 49 is displayed on the liquid crystal display monitor 47 arranged at the camera back as an electronic image through a processing means 52. A memory or the like is arranged on the processing means 52, where a photographed electronic picture can also be recorded. This memory may be arranged separately from the processing means 52 or it may be composed such that electronically writing of record is performed by using a floppy disk (registered trademark), etc. It may be composed as a film-based camera using a silver halide film instead of CCD 49.

Furthermore, on the optical path 44 for finder, an objective optical system 53 for finder is arranged. This objective optical system 53 for finder consists of a cover lens 54, a first prism 10, an aperture stop 2, a second prism 20, and a lens 66 for focusing. As an optical system from the cover lens 54 or the first prism 10 to the second prism 20, the optical system according to the present invention is used. The cover lens 54 used as a cover component is a lens which has negative power and expands an angle of view. The lens 66 for focusing arranged behind the second prism 20 can be adjusted in forward and backward directions on the optical axis and it is used for adjustment of focusing of the objective optical system 53 for finder. An object image formed on an image forming surface 67 of this objective optical system 53 for finder is formed on a view frame 57 of Porro prism 55 which is a component for making a erect image. The view frame 57 separates between a first refracting surface 56 of Porro prism 55 and a second refracting surface 58, and it is arranged between them. Behind the Porro prism 55, an eyepiece optical system 59 which leads an erect image formed to an observer eyeball E is arranged.

In the camera 40 composed in such way mentioned above, the objective optical system 53 for finders can be composed of less optical components, and high performance and low cost can be also achieved. Furthermore, since an optical path itself of the objective optical system 53 can be bent, the degree of freedom of arrangement inside of a camera increases and accordingly it becomes advantageous on designing.

Although no reference has been mentioned about the composition of an objective optical system 48 for photographing in the composition of FIG. 24, it is also possible, as a matter of course, to use an optical system in which prisms 10 and 20 are used according to the present invention besides a refracted type coaxial optical system as the objective optical system 48 for photographing.

Figure 25:
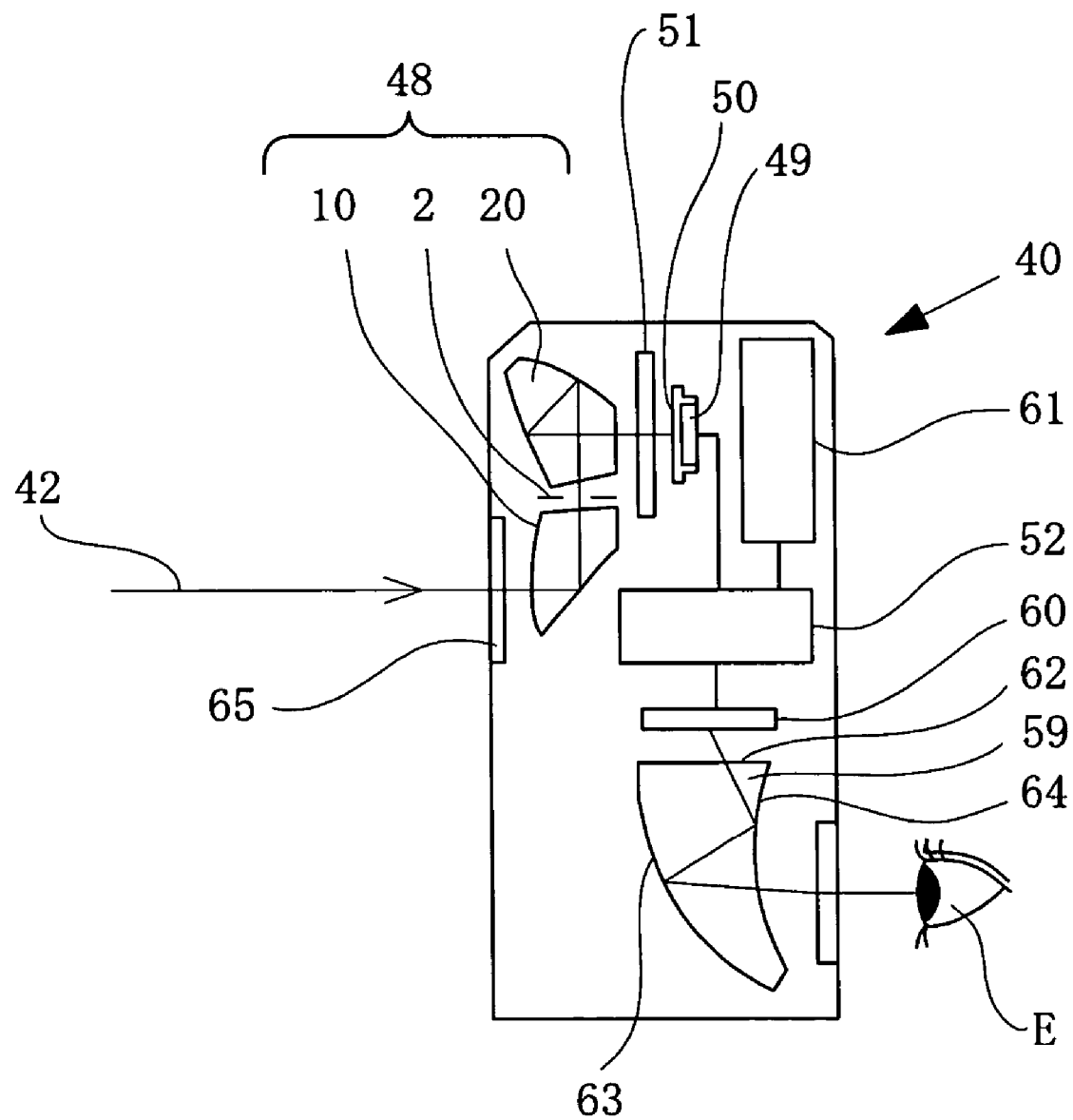
FIG. 25 is a conceptual diagram of another electronic camera to which the decentering optical system having a holding structure of the present invention has been applied.

Next, FIG. 25 is a conceptual diagram of a composition in which the decentering optical system having a holding structure of the present invention has been applied to the objective optical system 48 of the electronic camera 40. In this case, as the objective optical system 48 for photographing arranged on an photographing optical path 42, the optical system according to the present invention which consists of a first prism 10, an aperture stop 2 and a second prism 20 is used. An object image formed by this objective optical system 48 for photographing is formed on an imaging surface 50 of CCD 49 through a filter 51, such as a low pass filter, an infrared cut filter, etc. An object image received by this CCD 49 is displayed as an electronic image on the liquid crystal display element (LCD) 60 through a processing means 52. This processing means 52 also performs control of a record means 61 which records the object image photographed by CCD 49 as electronic information. The picture displayed on LCD 60 is led to an observer eyeball E through an eyepiece optical system 59. This eyepiece optical system 59 consists of a decentering prism, and in this example, it is composed of three surfaces which are an incident surface 62, a reflecting surface 63, and a surface 64 which is used for reflection and refraction. At least one of the surfaces 63 and 64 which have two reflecting actions, preferably both of the surfaces are composed of a free curved surface of plane symmetry which give power to luminous flux and has sole symmetry plane for correcting decentering. This sole symmetry plane is formed on a plane which is almost the same to the sole symmetry plane of the plane symmetry free curved surface which the prisms 10 and 20 of the objective optical system for photographing 48 have. This objective optical system for photographing 48 may contain other lenses (a positive lens, negative lens), as its composed component, at the object side of prisms 10 and 20, between the prisms or at the image side.

Thus, in the camera 40 composed in this way, an objective optical system 48 for photographing can be composed of less optical components and high performance and low cost can be also realized. Furthermore, since the whole optical system can be arranged side by side on the same plane, thinning of thickness in perpendicular direction to such plane can be achieved.

In this example, although a parallel plane board is arranged as the cover component 65 of the objective optical system 48 for photographing, a lens having power can be arranged like a precedent example.

Here, a surface arranged at utmost object side in the optical system of the present invention can be used also as a cover component without arranging a cover component.

In this example, the surface arranged at utmost object side is an incident surface of the first prism 10. However, since this incident surface is arranged in decentering state to the optical axis, if this surface is arranged at the front of a camera, one will have such illusion that a photographing center of the camera 40 has shifted from oneself when one views from the photographing object side (usually one feels that one is taking a photograph in a vertical direction of an incident surface as same as in case of a common camera), and accordingly, sense of incongruity will be given. Then, like this example, in case that a surface arranged at utmost object side is a decentering surface, it is desirable to arrange the cover component 65 (or the cover lens 54), since by such arrangement, when one views from a photographing object side, a photograph can be taken as same as in case of a conventional camera without feeling a sense of incongruity.

Figure 26A:
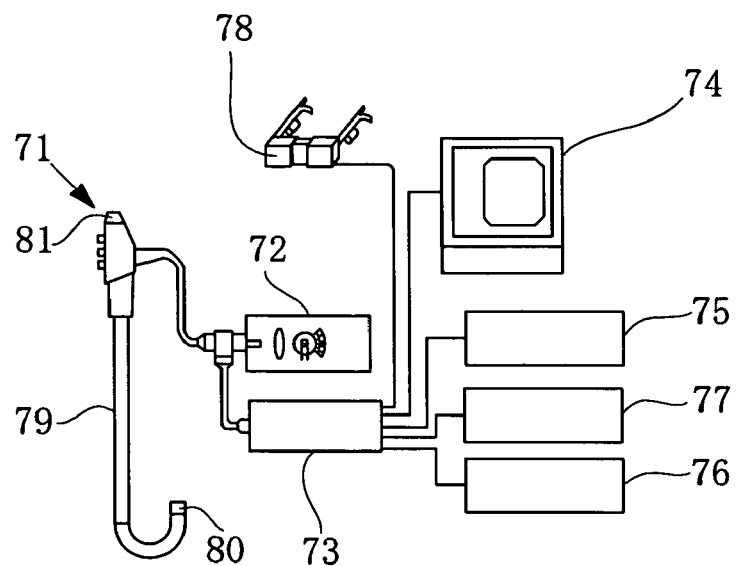
FIG. 26 is a conceptual diagram showing an electronic endoscope to which the decentering optical system having a holding structure of the present invention has been applied.
Figure 26B:
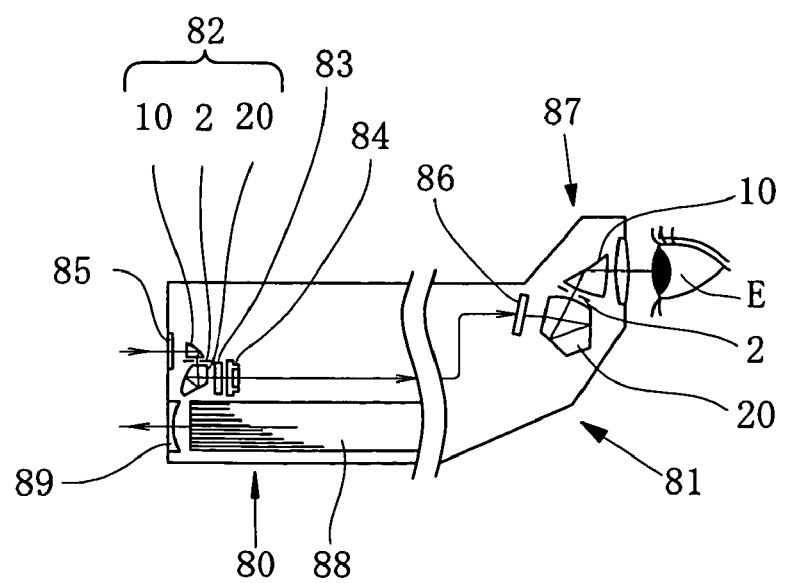

Next, FIG. 26 is a conceptual diagram showing a composition in which the decentering optical system having a holding structure of the present invention has been incorporated to an objective optical system 82, and the optical system according to the present invention has been applied to an eyepiece optical system 87 of an observation system of an electronic endoscope. In the case of this example, the optical system according to the present invention which comprises a first prism 10, an aperture stop 2 and a second prism 20 is used for the objective optical system 82 of an observation system, and the optical system according to the present invention which comprises a first prism 10, an aperture stop 2 and a second prism 20 is used for the eyepiece optical system 87 as an eyepiece optical system. As shown in FIG. 26A, this electronic endoscope is composed of an electronic endoscope 71, a light source unit 72 for supplying illuminating light, a video processor 73 which performs signal processing corresponding to the electronic endoscope 71, a monitor 74 which displays a picture signal outputted from the video processor 73, a VTR deck 75 which is connected with the video processor 73 and records picture signal etc., and a video disk 76, a video printer 77 which prints out the picture signal as an image, and a head mounting type image display unit (HMD) 78. A tip portion 80 of an insertion part 79 of the electronic endoscope 71 and its eyepiece portion 81 are composed as shown in FIG. 26B.

Luminous flux emanated from the light source unit 72 illuminates an observation portion by an objective optical system 89 for lighting through the light guide fiber bundle 88. Then, the light from the observation portion is formed as an object image through a cover component 85 by the objective optical system 82 for observation.

This object image is formed on the imaging surface of CCD 84 through a filter 83, such as a low pass filter, an infrared cut filter, etc. Furthermore, this object image is converted into a picture signal by CCD 84, and while the picture signal is displayed directly on the monitor 74 by the video processor 73 shown in FIG. 26A, it is recorded into VTR deck 75 and a video disk 76 and printed out as an image from a video printer 77. It is also displayed on an image display element of HMD 78, and is observed by a person wearing HMD 78. At the same time, a converted picture signal is displayed as an electronic image on the liquid crystal display element (LCD) 86 of the eyepiece portion 81 by CCD 84, and the displayed image is led to the observer eyeball E through an eyepiece optical system 87 using the optical system of the present invention.

In the endoscope composed in such way mentioned above, it can be composed of less optical components, and high performance and low cost can be also achieved. And such effect can be obtained without hindering thinning of a diameter since the objective optical system 80 is arranged in a line with an elongated axial direction of the endoscope.

By the way, the decentering optical system equipped with the holding structure of the present invention can be used also as a projection optical system by making an optical path reverse.

Figure 27:
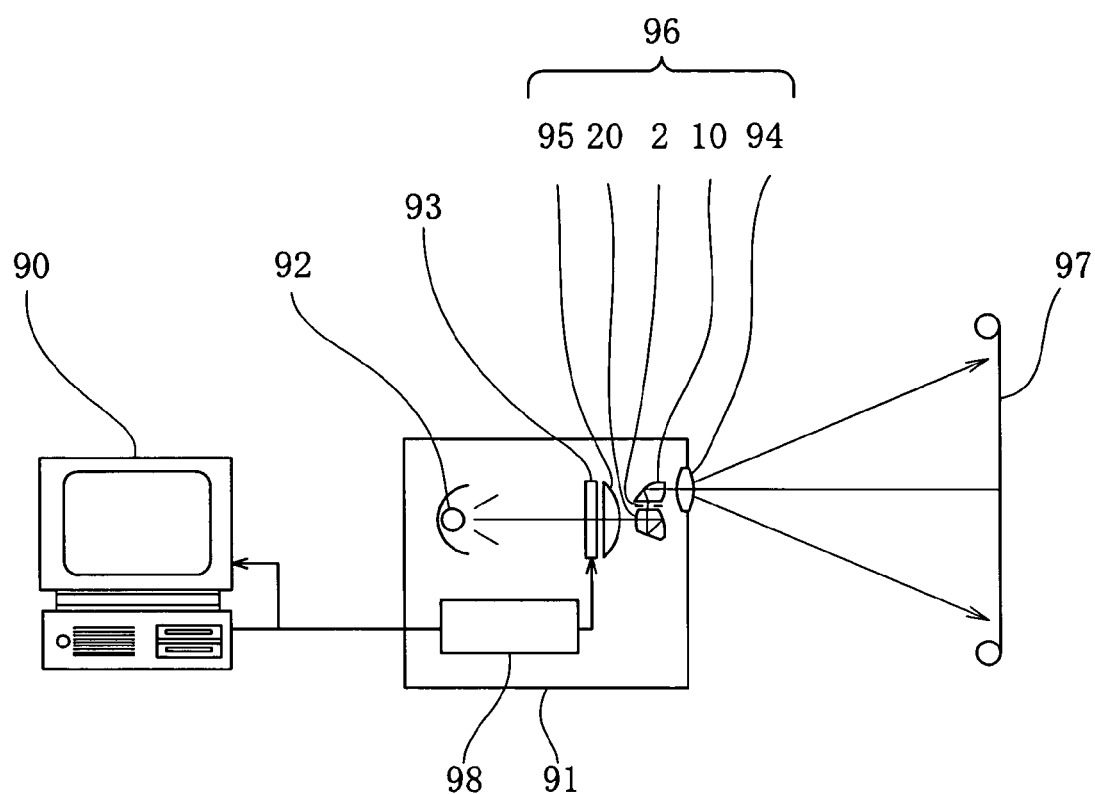
FIG. 27 is a conceptual diagram showing a composition using an optical system having a holding structure according to the present invention for a projection optical system of presentation system.

FIG. 27 is a conceptual diagram showing a composition in which a prism optical system according to the present invention is used for a projection optical system 96 of presentation system which combines a liquid crystal projected 91 and a personal computer 90. In this example, the optical system according to the present invention which comprises a first prism 10, an aperture stop 2 and a second prism 20 is used for a projection optical system 96.

In FIG. 27, a picture and manuscript data created on the personal computer 90 are branched from monitor output and output to a processing control portion 98 of the liquid crystal projector 91. In the processing control portion 98 of the liquid crystal projector 91, this input data is processed and it is output to a liquid crystal panel (LCP) 93. On a liquid crystal panel 93, a picture image according to this input image data is displayed. Luminous flux from a light source 92 is projected on a screen 97 after an amount of penetration is determined by the gradation of the picture displayed on the liquid crystal panel 93, through the projection optical system 96 which comprises a field lens 95 arranged just before the liquid crystal panel 93, the first prism 10, the aperture stop 2 and the second prism 20 which compose the optical system of the present invention, and a cover lens 94 of a positive lens. In the projector composed in such way mentioned above, it can be composed of less optical components, and high performance and low cost can be achieved as well as miniaturization is possible.

Figure 28:
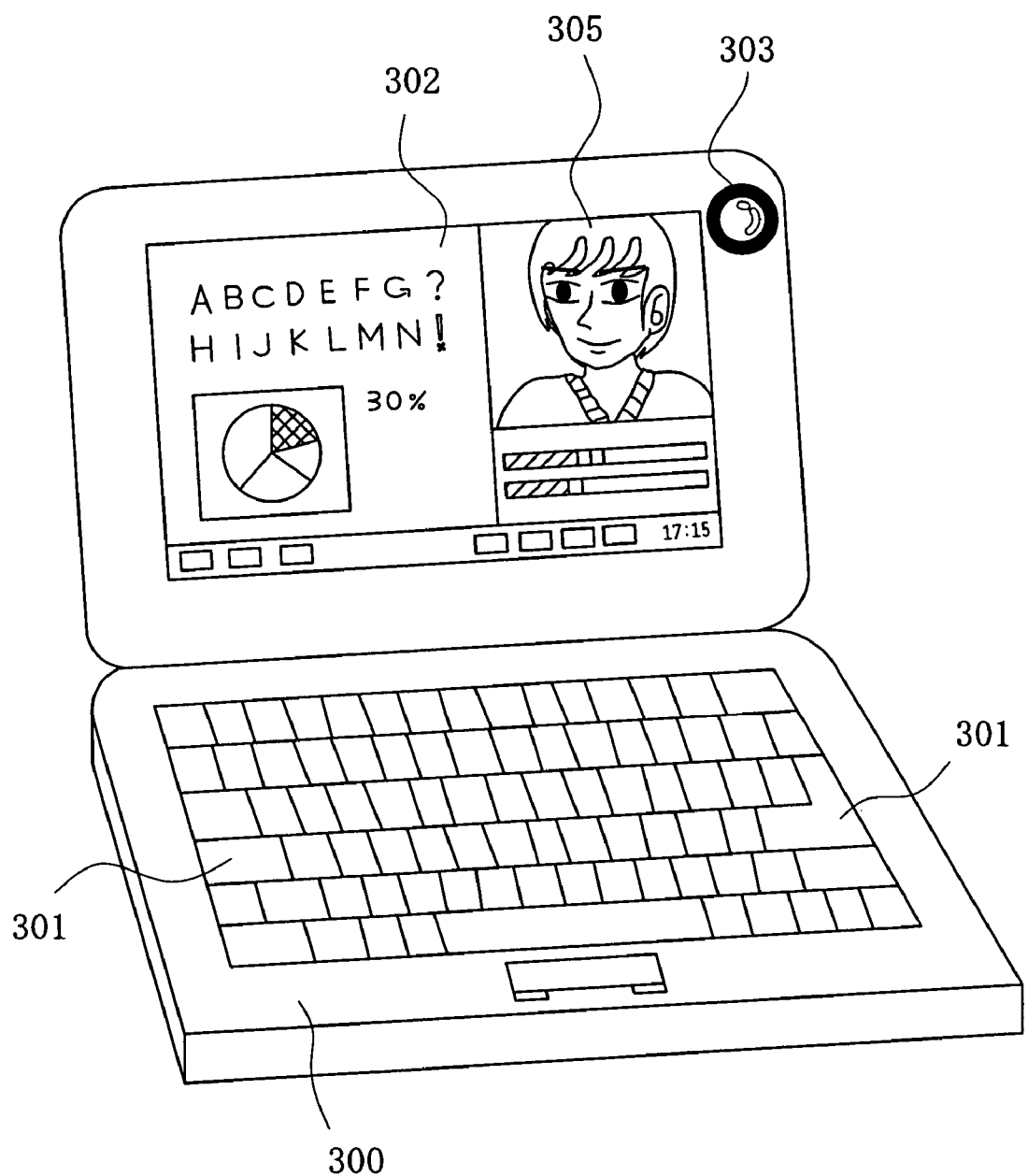
FIG. 28 is a front perspective view showing a personal computer in which the decentering optical system having a holding structure of the present invention has been incorporated as an objective optical system, and a cover of which has been lifted.
Figure 29:
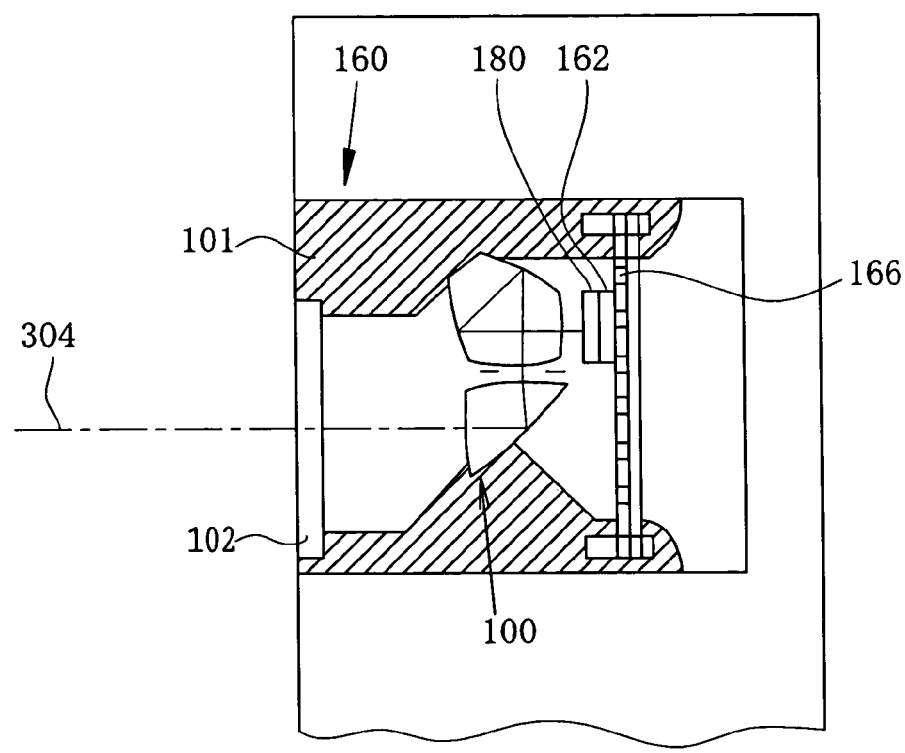
FIG. 29 is sectional drawing of a photographing optical system of the personal computer.
Figure 30:
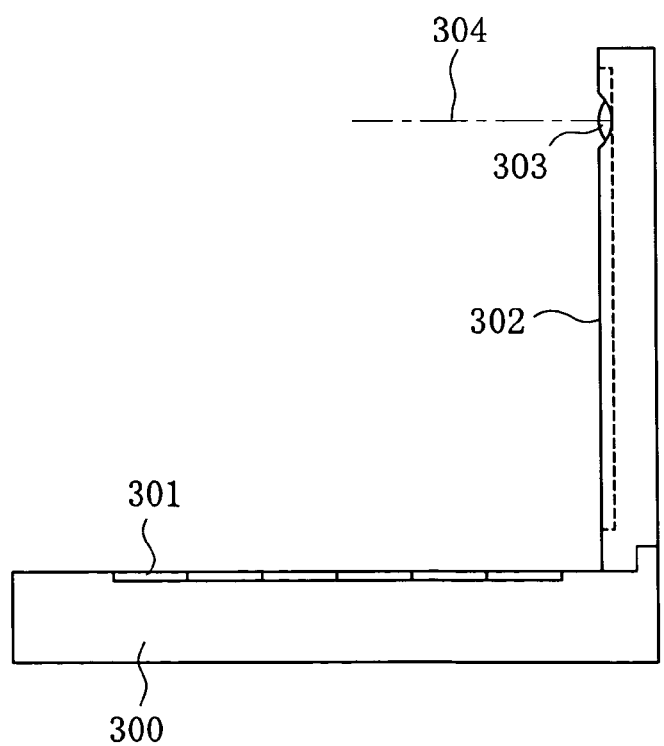
FIG. 30 is a side view of the state of FIG. 28.

Next, FIGS. 28 to 30 are conceptual diagrams showing compositions in which the decentering optical system having the holding structure of the present invention has been built in a personal computer which is an example of information processing equipment. FIG. 28 is a front perspective view showing a personal computer 300, a cover of which is lifted, FIG. 29 is a sectional view of a photographing optical system of the personal computer 300 and FIG. 30 is a side view of the state of FIG. 28. As shown in FIGS. 28 to 30, a personal computer 300 has a keyboard 301 for an operator to input information from outside, an information processing means and record means of which an illustration is omitted, a monitor 302 which displays information to the operator, and a photographing optical system 303 for photographing a picture image of the operator himself or herself or the circumference. Here, the monitor 302 may be a penetrated type liquid crystal display element illuminated from the back side by the back light which is not illustrated, a reflective type liquid crystal display element which reflects and displays a light from the front side, a CRT display, etc. In these drawings, although the photographing optical system 303 is arranged at upper right portion in the monitor 302, it may be anywhere not only a spot but also a perimeter portion on the monitor 302, or around a keyboard 301. This photographing optical system 303 has an objective optical system 100 which comprises an optical system of the present invention and the imaging element chip 162 which receives an image on photographing optical path 304. These are built in the personal computer 300.

Here, 1R cut filter 180 is additionally stuck on an imaging element chip 162 and formed in one as an imaging unit 160, and it is inserted in the back end of the mirror holding frame 101 of the objective optical system 100 by one-touch action so that attachment becomes possible. Therefore, the centering alignment of the objective optical system 100 and an imaging element chip 162 and adjustment of a surface distance are unnecessary, and assembly is easy. At the tip of the mirror holding frame 101, the cover glass 102 for protecting the objective optical system 100 is arranged. An object image received by the photographing element chip 162 is input into a processing means of the personal computer 300 through a terminal 166 and is displayed on the monitor 302 as an electronic picture. In this figure, as an example, a picture image 305 of a photographed operator is shown. This picture 305 can also be displayed on the personal computer of a communication partner from a remote place through the Internet or a telephone, etc. through a processing means.

Next, FIG. 31 shows an example in which a decentering optical system having the holding structure according to the present invention has been built in a telephone, especially in a cellular phone which is convenient to carry, as another example of information processing equipment.

Figure 31A:
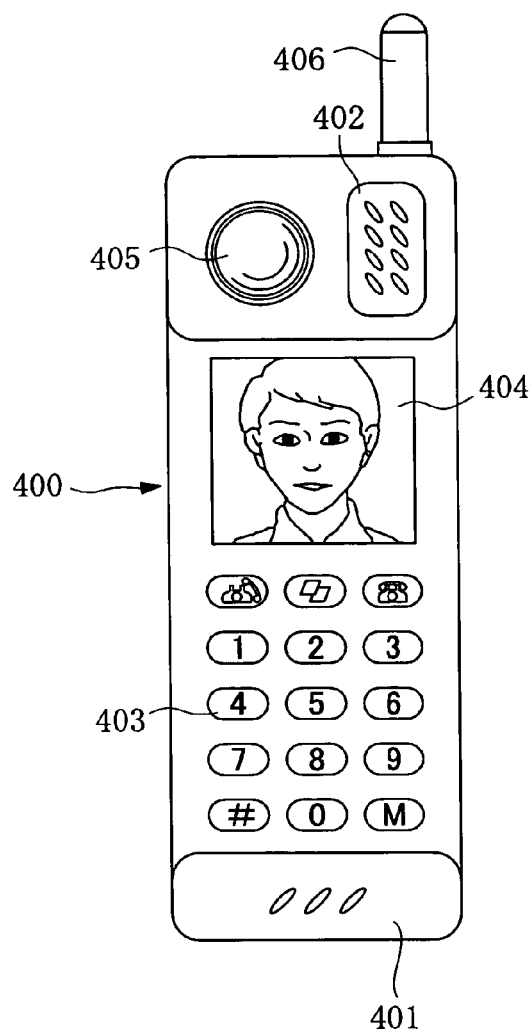
FIGS. 31A, 31B, and 31C are a front view and a side view of a cellular phone with which the decentering optical system having a holding structure of the present invention has been incorporated as an objective optical system, and its sectional view of a photographing optical system, respectively.
Figure 31B:
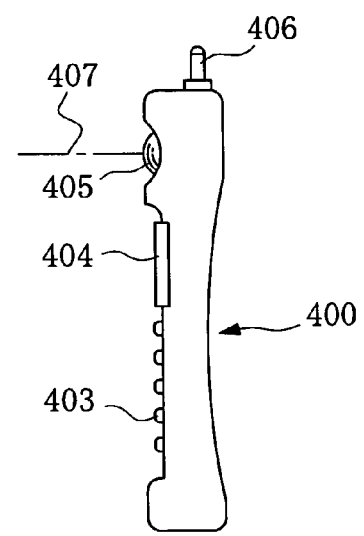
Figure 31C:
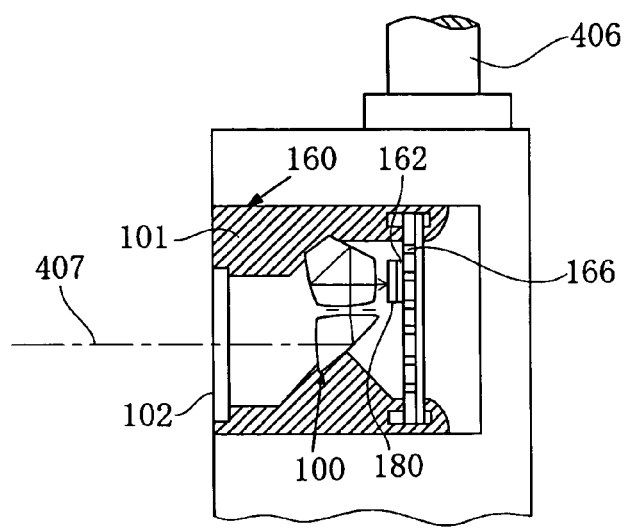

FIG. 31A, is a front view of a cellular phone 400, FIG. 31B is a side view of the cellular phone, and FIG. 31C is a sectional view of a photographing optical system 405. As shown in FIGS. 31A to 31C, the cellular phone 400 has a microphone part 401 which inputs an operator's voice as information, and a speaker part 402 which outputs voice of a telephone call partner, an input dial 403 for which the operator inputs information, and a monitor 404 which displays information, such as a photographed image of the operator himself or herself or a telephone call partner, and a telephone number, etc., a photographing optical system 405, an antenna 406 which performs transmission and reception of a communication electric wave, and a processing means (an illustration is not shown) which processes picture information, communication information, incoming signal, etc. Here, a monitor 404 is a liquid crystal display element. In these figures, an arrangement or a layout of each composition is not limited particularly to these shown in these figures. These are built in the cellular phone 400. This photographing optical system 405 has an objective optical system 100, which consists of an optical system of the present invention, arranged on a photographing optical path 407, and an imaging element chip 162 which receives an image.

Here, an infrared (IR) cut filter 180 is stuck additionally on the imaging element chip 162 so as to form one unit as an imaging unit 160, and it can be attached at a back end portion of a mirror holding frame 101 by inserting an objective lens by one-touch action. Therefore, centering alignment and adjustment of surface distance of an objective lens and an imaging element chip 162 become unnecessary, and accordingly, assembling becomes easy. At a tip of the mirror holding frame 101, the cover glass 102 for protecting the objective optical system 100 is arranged.

An object image received by the photographing element chip 162 is input into a processing means which is not illustrated through a terminal 166. Then, it is displayed on the monitor 404 as an electronic picture or on a monitor of a communication partner or on both monitors. When a picture image is transmitted to a communication partner, a signal processing function by which an information of the object image received by the imaging element chip 162 is converted into a signal which can be transmitted, is included in the processing means mentioned above.

What is claimed is:

1. A decentering optical system comprising,
    at least one decentering prism, and
    a holding component for holding the decentering prism,
    wherein the decentering prism has two or more positioning portions at positions which sandwich an effective diameter of an optically functional surface thereof held by the holding component,
    wherein the holding component has positioning-portion holding portions to be mated with the positioning portions of the decentering prism,
    wherein either the optically functional surface held by the holding component or the holding component has at least two projected portions at-positions that are located outside of the positioning portions of the decentering prism or the positioning-portion holding portions of the holding component as sandwiching the effective diameter of the optically functional surface, and
    wherein the decentering prism is positioned and fixed to the holding component through the positioning portions, the positioning-portion holding portions and the projected portions.

2. A decentering optical system comprising,
    a first decentering prism,
    a holding component having an aperture stop, and
    a second decentering prism,
    wherein an exit surface, which is an optically functional surface, of the first decentering prism has at least two positioning portions at positions which sandwich an effective diameter thereof, and an entrance surface, which is an optically functional surface, of the second decentering prism has at least two positioning portions at positions which sandwich an effective diameter thereof,
    wherein the holding component has, at both surfaces thereof respectively, first positioning-portion holding portions to be mated with the positioning portions of the first decentering prism and second positioning-portion holding portions to be mated with the positioning portions of the second decentering prism,
    wherein the first and the second decentering prisms are positioned and fixed from both sides of the holding component via their respective positioning portions and the first and the second positioning-portion holding portions of the holding component,
    wherein the holding component is constructed separately from the first decentering prism and the second decentering prism,
    wherein either the exit surface of the first decentering prism or the holding component has at least two projected portions that are located outside the positioning-portions of the first decentering prism or the first positioning-portion holding portions as sandwiching the effective diameter of the exit surface of the first decentering prism, and either the entrance surface of the second decentering prism or the holding component has at least two projected portions that are located outside the positioning-portions of the second decentering prism or the second positioning-portion holding portions as sandwiching the effective diameter of the entrance surface of the second decentering prism, and
    wherein the first positioning-portion holding portions are located at positions different from positions of the second positioning-portion holding portions in the holding component.

3. An optical apparatus using the decentering optical system according to claim 1.

4. The optical system according to claim 1,
    wherein the positioning-portion holding portions are composed of penetrated holes to be fitted to or cemented with the positioning portions of the decentering prism.

5. The decentering optical system according to claim 1,
    wherein the holding component has an aperture stop corresponding to the effective diameter of the optically functional surface.

6. The decentering optical system according to claim 1, wherein the following condition is satisfied:

$$0.2 < t/H < 0.8$$

where t represents a height of the positioning portion, and H represents a thickness of the holding component.

7. The decentering optical system according to claim 1 or 2,
    wherein three projected portions are arranged asymmetrically on the optically functional surface.

8. A decentering optical system comprising,
    a first decentering prism,
    a holding component having an aperture stop, and
    a second decentering prism,
    wherein an exit surface, which is an optically functional surface, of the first decentering prism has at least two positioning portions at positions which sandwich an effective diameter thereof, and an entrance surface, which is an optically functional surface, of the second decentering prism has at least two positioning portions at positions which sandwich an effective diameter thereof,
    wherein the holding component has, at both surfaces thereof respectively, first positioning-portion holding portions to be mated with the positioning portions of the first decentering prism and second positioning-portion holding portions to be mated with the positioning portions of the second decentering prism,
    wherein the first and the second decentering prisms are positioned and fixed from both sides of the holding component via their respective positioning portions and the first and the second positioning-portion holding portions of the holding component,
    wherein the holding component is constructed separately from the first decentering prism and the second decentering prism, and
    wherein the following condition is satisfied:

$$0.2 < t/H < 0.8$$

where t represents a height of the positioning portion, and H represents a thickness of the holding component.

* * * * *